(12) United States Patent
Shimoda

(10) Patent No.: US 6,654,413 B2
(45) Date of Patent: Nov. 25, 2003

(54) PHASE SYNCHRONIZATION METHOD FOR EXTENDED PARTIAL RESPONSE, AND PHASE SYNCHRONIZATION CIRCUIT AND READ CHANNEL CIRCUIT USING THIS METHOD

(75) Inventor: Kaneyasu Shimoda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 370 days.

(21) Appl. No.: 09/793,339

(22) Filed: Feb. 26, 2001

(65) Prior Publication Data

US 2001/0005405 A1 Jun. 28, 2001

Related U.S. Application Data

(63) Continuation of application No. PCT/JP99/00165, filed on Feb. 4, 1999.

(30) Foreign Application Priority Data

Sep. 2, 1998 (JP) ............................................ 10-248716

(51) Int. Cl.$^7$ ................................................ H03H 7/30
(52) U.S. Cl. ...................... 375/232; 375/263; 375/362; 360/65
(58) Field of Search ................................ 375/232, 354, 375/350, 362, 263; 708/300, 323; 360/39, 65; 369/59.16

(56) References Cited

U.S. PATENT DOCUMENTS

| | | | | |
|---|---|---|---|---|
| 6,003,051 A | * | 12/1999 | Okazaki | ........................ 708/3 |
| 6,005,507 A | * | 12/1999 | Nakatsu et al. | ............. 341/155 |
| 6,122,126 A | * | 9/2000 | Yamakoshi et al. | ........... 360/66 |
| 6,198,711 B1 | * | 3/2001 | Fujita et al. | ............. 369/59.16 |

FOREIGN PATENT DOCUMENTS

| | | |
|---|---|---|
| JP | 6-36208 | 2/1994 |
| JP | 6-84290 | 3/1994 |
| JP | 6-124545 | 6/1994 |
| JP | 6-180949 | 6/1994 |
| JP | 6-343039 | 12/1994 |
| JP | 7-93910 | 4/1995 |
| JP | 7-192406 | 7/1995 |
| JP | 7-2110088 | 8/1995 |
| JP | 8-138324 | 5/1996 |
| JP | 10-199150 | 7/1998 |

* cited by examiner

*Primary Examiner*—Don N. Vo
(74) *Attorney, Agent, or Firm*—Greer, Burns, & Crain Ltd.

(57) ABSTRACT

"100", which is one of the (1, 7) RLL codes, is used as a clock acquisition pattern. After temporarily judging the sample output to be one of (1, −1), the phase error computing result for three samples (symbols) is added so as to cancel the errors of phase computing. Therefore the number of judgment states can be decreased, and phase can be acquired at high-speed even if the amplitude at acquisition has not been defined. At tracking, the sample output is judged to be one of three groups, [1+a, 1], 0, and [−1, −1−a]. Using the state transition of (1, 7) RLL codes, [1+a, 1] and [−1, −1−a] are distinguished. Since the number of judgment states decreases, judgment accuracy improves.

22 Claims, 20 Drawing Sheets

FIG. 14

| Condition for judgement | | Judged value X(n) |
|---|---|---|
| $0.5 < Y(n-1)$   $0.5 < Y(n)$ | $Y(n-1) \leq Y(n)$ | $1+a$ |
| | $Y(n) < Y(n-1)$ | $1$ |
| $0.5 < Y(n)$   $0.5 < Y(n+1)$ | $Y(n+1) \leq Y(n)$ | $1+a$ |
| | $Y(n) < Y(n+1)$ | $1$ |
| $-0.5 \leq Y(n) \leq 0.5$ | | $0$ |
| $Y(n-1) < -0.5$   $Y(n) < -0.5$ | $Y(n-1) \leq Y(n)$ | $-1$ |
| | $Y(n) < Y(n-1)$ | $-1-a$ |
| $Y(n) < -0.5$   $Y(n+1) < -0.5$ | $Y(n+1) \leq Y(n)$ | $-1$ |
| | $Y(n) < Y(n+1)$ | $-1-a$ |

PR-4

EPR4
(MEPR4)

EEPR 4
(MMEEPR4)

PHASE SYNCHRONIZATION METHOD FOR EXTENDED PARTIAL RESPONSE, AND PHASE SYNCHRONIZATION CIRCUIT AND READ CHANNEL CIRCUIT USING THIS METHOD

This application is a continuation of PCT/JP99/00165 filed on Feb. 4, 1999.

TECHNICAL FIELD

The present invention relates to a phase synchronization method to synchronize phases, a phase synchronization circuit, and a read channel circuit in an extended partial response regeneration system using (1, 7) RLL codes.

BACKGROUND ART

For a storage device, such as a magnetic recording device and an optical recording device, high density recording is demanded. Therefore, in a magnetic recording device, a partial response recording system is used. For partial response recording, 8/9 codes are used. 8/9 codes are codes that convert 8 bits to 9 bits. 8/9 codes are codes where the number of "0s" between "1" and "1" is a minimum of 0 and a maximum of 4.

In this magnetic recording device, high-density recording can be implemented by decreasing the size of magnetic particles of the magnetic recording medium. However, if the size of magnetic particles is decreased, thermal relaxation, where the direction of magnetic domain changes due to heat, tends to occur. This thermal relaxation deletes magnetic information. Therefore (1, 7) RLL codes with low recording frequency are used instead of using 8/9 codes.

(1, 7) RLL codes are codes where the number of "0s" between "1" and "1" is a minimum of 1 and a maximum of 7. Since one "0" is always inserted between "1" and "1", recording frequency is decreased. By using this codes, the loss of magnetic information by thermal relaxation can be prevented.

For the (1, 7) RLL codes, an extended partial response recording system, such as EPR (Extended Partial Response) and EEPR (Extended Extended Partial Response) having a low frequency spectrum, is used. In such a system, a phase synchronization method for synchronizing clocks stably is demanded.

FIG. 17 is a block diagram depicting a prior art, FIG. 18 is a spectrum diagram of a partial response, and FIG. 19(A), FIG. 19(B) and FIG. 19(C) are diagrams depicting partial responses.

FIG. 17 shows a recording channel and a read channel of a partial response magnetic recording. As FIG. 17 shows, the recording channel has a coder 93 that converts recording data to (1, 7) codes. The output of the coder 93 is pre-coded by the pre-coder 94, then is written to the magnetic disk 91 by the magnetic head 90 via the amplifier 95.

The recorded data is read from the magnetic disk 91 by the magnetic head 90. The output of the magnetic head 90 is input to the PR equalizer 98 via the amplifier 97. The PR equalizer 98 executes partial response equalization. The output is sampled by the sampler 99. An analog/digital converter is normally used for the sampler 99.

The output of the sampler 99 is input to a five-value judgment unit 100 for five-value judgment. The five-value judgment output is input to the maximum-likelihood detector 101 where the maximum-likelihood value is detected. And the detection signal is input to the (1–D) equalizer 102 that has a (1–D) equalization characteristic. The (1–D) equalizer 102 cancels the characteristic of the pre-coder 94. Furthermore, the output of the (1–D) equalizer 102 is decoded by the (1, 7) decoder 103. By doing this, regeneration data is obtained.

The judgment output of the five-value decision unit 100 and the sample output are input to the phase error computing unit 104. The phase error computing unit 104 computes the phase error from the judgment output and the sample output. This error is smoothed by the loop filter 105. And the voltage control oscillator (VCO) 106 generates a clock at a frequency (phase) according to the output of the loop filter 105. This clock is used as a sampling clock of the sampler 99.

Since these (1, 7) RLL codes are codes having at least one "0" between "1" and "1", recording frequency is low. So even if high-density recording is executed, loss of data by thermal relaxation can be prevented.

As FIG. 18 shows, in a partial response, the spectrum of EPR-4 (Extended Partial Response Class-4) has a lower frequency than the spectrum of PR-4 (Partial Response Class-4). In other words, EPR-4 has a higher gain at low frequency. And EEPR-4 (Extended Extended Partial Response Class-4) has an even lower frequency spectrum.

Since (1, 7) RLL codes have a low frequency spectrum, EPR-4 and EEPR-4, where low frequency gain is high, are appropriate. When D is the delay operator, and PR-4 is given by the transfer function $(1-D)\cdot(1+D)$, then EPR-4 is given by the transfer function $(1-D)\cdot(1+D)\cdot(1+D)$. And EEPR-4 is given by $(1-D)\cdot(1+D)\cdot(1+D)\cdot(1+D)$.

As a modification of EPR-4, MEPR-4 (Modified Extended Partial Response Class-4) given by the transfer function $(1-D)\cdot(1+D+D^2)$ and MMEPR-4 (Modified Modified Extended Partial Response Class-4) given by the transfer function $(1-D)\cdot(1+1.5D+D^2)$ are known. As a modification of EEPR-4, MEEPR-4 (Modified Extended Extended Partial Response Class-4) given by the transfer function $(1-D)\cdot(1+D)\cdot(1+D+D^2)$ and MMEEPR-4 (Modified Modified Extended Extended Partial Response Class-4) given by the transfer function $(1-D)\cdot(1+D)\cdot(1+1.5D+D^2)$ are known.

This partial response in a broad sense, which includes the transfer formula $(1-D)\cdot(1+(1+a)D+D^2)$, is called an "extended partial response". Here $a \geq 0$. As FIG. 19(A) shows, the regenerated solitary wave in PR-4 indicates three states, 1, 0 and –1. The regenerated solitary wave of EPR-4 (MEPR-4), on the other hand, indicates five states, 2 (1.5), 1, 0, –1 and –2 (–1.5), as shown in FIG. 19(B). Also as FIG. 19(C) shows, the regenerated solitary wave of EEPR-4 (MMEEPR-4) indicates five states, 2 (1.5), 1, 0, –1 and –2 (–1.5).

In this way, the extended partial response in a broad sense has five states. In the extended partial response, the phase synchronization operation has been executed as follows.

As FIG. 20 shows, the magnetic disk 90 has an acquisition area 111 and a data area 112 in each sector 110. In the acquisition area 111, data to train each part of the regeneration circuit is written. In this acquisition area 111, the clock acquisition pattern (phase synchronization pattern) is recorded.

As FIG. 17 shows, an acquisition pattern is read at acquisition. And the state is judged by comparing the amplitude of the acquisition pattern and the slice level. A phase error is computed from the judgment value and the sampling output. The phase of the clock of the voltage control oscillator 106 is synchronized by this computed phase error. At tracking to read the data area, the state of a signal is judged by comparing the amplitude of the read data of the data area 112 with the slice level. From the judgment value and the sample output, a phase error is computed, and the phase of the clock of the voltage control oscillator 106 is synchronized.

For this conventional acquisition pattern, the pattern of a 4T period (T is the sampling interval) has been used for PR-4, as shown in FIG. 21. This pattern is a continuous pattern of "1s" in 8/9 codes.

Also conventionally, it is necessary to judge the read signal to be one of five values to compute the phase error, since an extended partial response takes five value states.

At first, in the case of (1, 7) RLL codes, where 2 bits are converted to 3 bits, encoding efficiency is poor compared with 8/9 codes, where 8 bits are converted to 9 bits. Therefore compared with 8/9 codes, track recording density must be increased to record in the case of (1, 7) RLL codes. If a conventional acquisition pattern with a 4T period is used when the track recording density is high like this, the amplitude of the regeneration signal for clock acquisition drops due to inter-symbol interference. As a result, S/N drops and clock acquisition becomes difficult.

Secondly, if (1, 7) RLL codes and the extended partial response in a broad sense are combined, there are five signal states, as described in FIG. 19(B) and FIG. 19(C). Therefore, conventionally five values are judged, and slice levels SL1 and SL2 for five-value judgment are used. If there are many states to judge like this at acquisition before amplitude stabilizes, errors in the judgment result tend to increase. Therefore errors are reflected in the phase errors. As a result, phase acquisition cannot be stably executed at acquisition time.

Thirdly, there are many states to judge at tracking as well, so errors in the judgment result tend to increase and errors are reflected in the phase error. Therefore phase synchronization cannot be stably executed at tracking.

It is an object of the present invention to provide a phase synchronization method for an extended partial response, and for a phase synchronization circuit and a read channel circuit thereof for executing a clock acquisition operation at acquisition at high-speed in an extended partial response suitable for (1, 7) RLL codes.

It is another object of the present invention to provide a phase synchronization method for an extended partial response, and a phase synchronization circuit and a read channel circuit thereof for executing phase synchronization at tracking stably in an extended partial response suitable for (1, 7) RLL codes.

It is still another object of the present invention to provide a phase synchronization method for an extended partial response, and a phase synchronization circuit and a read channel circuit thereof for computing a phase error with less number of state judgments in an extended partial response suitable for (1, 7) RLL codes.

DISCLOSURE OF THE INVENTION

To achieve these objects, the present invention is a phase synchronization method where extended partial response equalization is executed on a recording signal read from the recording medium, then a phase synchronization operation is executed.

The phase synchronization method comprises a step of executing extended partial response equalization having a $[1+(1+a)D+D^2]$ ($a \geq 0$) characteristic on the recording signal, a step of sampling the equalization output by clocks, a step of temporarily judging the sample output of the "100" gap pattern written in the acquisition area of the recording medium to be [one of] two values (1, −1), a step of computing the phase error by the temporal judgment value and the above sample output, a step of adding the above phase error for three samples, and a step of generating clocks with a phase according to the addition result.

At first, the present invention uses the "100" of 6T period, which is one of the (1, 7) RLL codes, as a pattern for clock acquisition. Since the pattern of the repeat of "100" is a 6T pattern, the period is longer than a conventional 4T pattern. Therefore, even if the track recording density becomes higher, the drop in amplitude due to inter-symbol interference is minimal. Since the amplitude of the regeneration signal of the acquisition pattern is sufficient, clock acquisition can be executed stably.

Secondly, the present invention temporarily judges the sample output to be one of (1, −1). In the extended partial response, which has five value states, "1" and "1+a", and "−1" and "−1−a" are not distinguished. Therefore an error occurs when a phase error is computed by the temporal judgment values. However, because the acquisition pattern is a 6T period repeat pattern, the error of phase computing is cancelled when phase error computing results for the three samples (symbols) are added. Therefore, the judgment states can be decreased, and phases can be acquired at high-speed even if the amplitude is not defined at acquisition.

The phase synchronization method in another embodiment of the present invention further comprises a step of retaining the temporal judgment value. The temporal judgment step is comprised of a step of selecting a first threshold value or a second threshold value according to the retention value, and a step of comparing the selected threshold value and the above mentioned sample output.

In this embodiment where the acquisition pattern is a 6T period repeat pattern, the judgment value after 3T can be estimated. Therefore the temporal judgment value is retained and the next judgment threshold level is selected. By changing the threshold level dynamically like this, judgment accuracy can be improved.

According to a phase synchronization method of another embodiment of the present invention, the temporal judgment step further comprises an initialization step of judging the sample output to be one of two values by the plurality of the sample output, and initializing the retention value. By doing this, a retention value can be automatically initialized.

A phase synchronization method of another embodiment of the present invention is a phase synchronization method for an extended partial response where phase synchronization is executed after extended partial response equalization is executed on a recording signal which was encoded by (1, 7) RLL codes and read from the recording medium. This phase synchronization method comprises a step of executing extended partial response equalization with a $[1+(1+a)D+D^2]$ ($a \geq 0$) characteristic on a recording signal, a step of sampling the equalization output by clocks, a step of classifying the above sample output into three groups of temporal judgment values [1+a, 1], 0, and [−1,−1−a], a judgment step of judging the above sample output to be [one of] five values from the high/low relationship with the sample outputs before and after the above sample output and the classified three groups of temporal judgment values, an error computing step of computing the phase error from the five-value judgment value and the above sample output, and a clock generation step of generating a clock with a phase according to the phase error.

In this embodiment, the number of judgment states is decreased at tracking. At tracking, where five values, 1+a, 1, 0, −1 and −1−a, exist, a judgment error tends to occur between [1+a and 1] and [−1 and −1−a], so the sample output is judged to be one of the three groups, [1+a, 1], 0 and [−1,−1−a].

Then to distinguish between [1+a and 1] and [−1 and −1−a], a state transition of (1, 7) RLL codes is used. In other words, (1, 7) RLL codes have regularity in the state of the sample and in the state of the samples before and after the sample. Using this, the high/low relationship between the sample value and the sample values before and after the sample value is judged to distinguish between [1+a and 1] and [−1 and −1−a]. Since the number of judgment states decreases, judgment accuracy improves. As a result, computing errors reflected in phase errors decrease, and phase synchronization can be executed stably.

It is preferable that in this judgment step, "1+a" or "1" is judged from the high/low relationship between sample outputs before and after the sample output and the sample output when the above temporal judgment value is in the [1+a, 1] group, and "−1−a" or "−1" is judged from the high/low relationship between sample outputs before and after the sample output and the sample output when the above temporal judgment value is in the [−1, −1−a] group.

BRIEF DESCRIPTION OF THE DRAWINGS

FIG. 14 shows a configuration of a conversion table in FIG. 13;

PREFERRED EMBODIMENTS OF THE INVENTION

Figure 1:
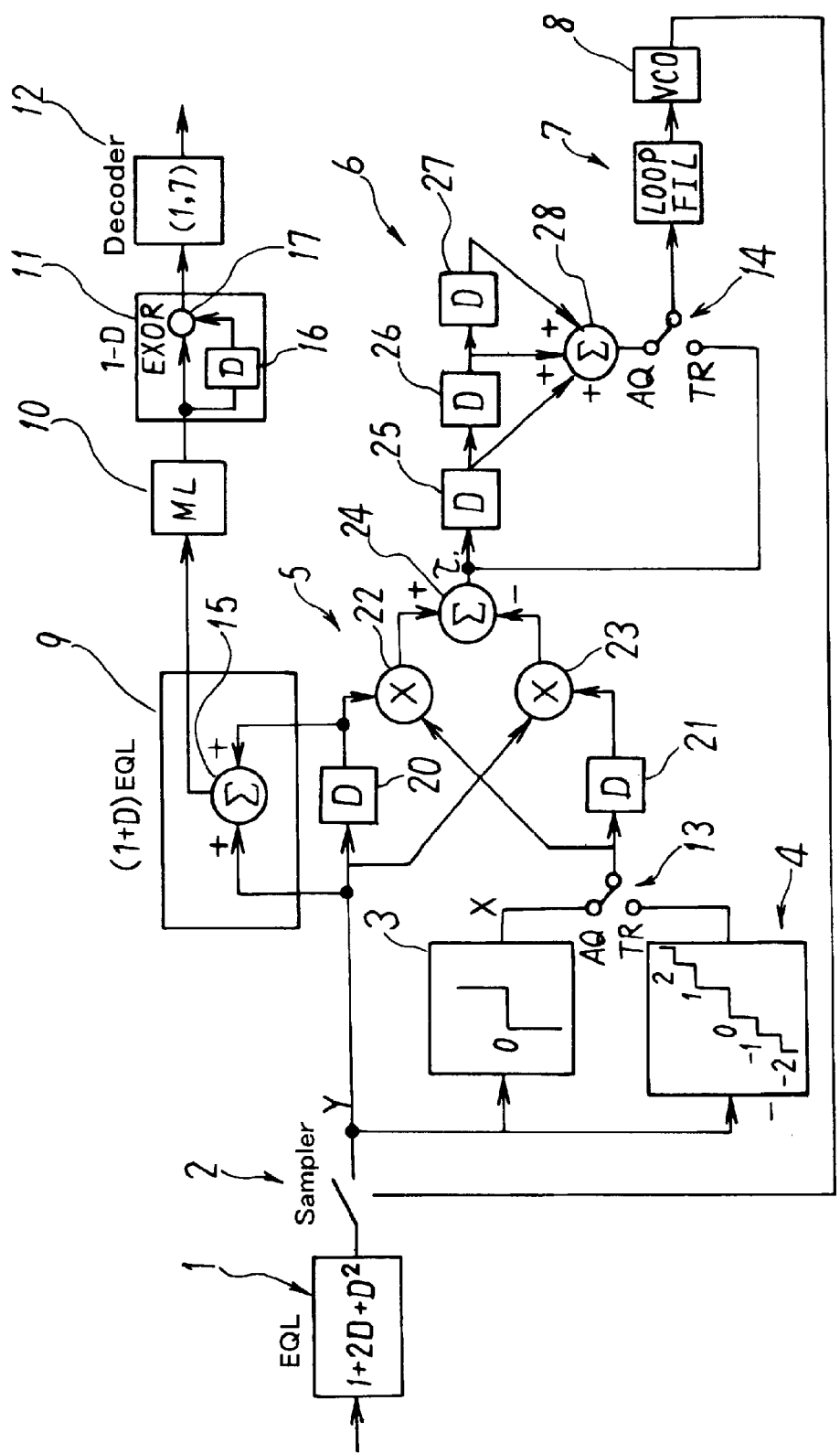
FIG. 1 is a block diagram depicting an embodiment of the present invention.
Figure 2:
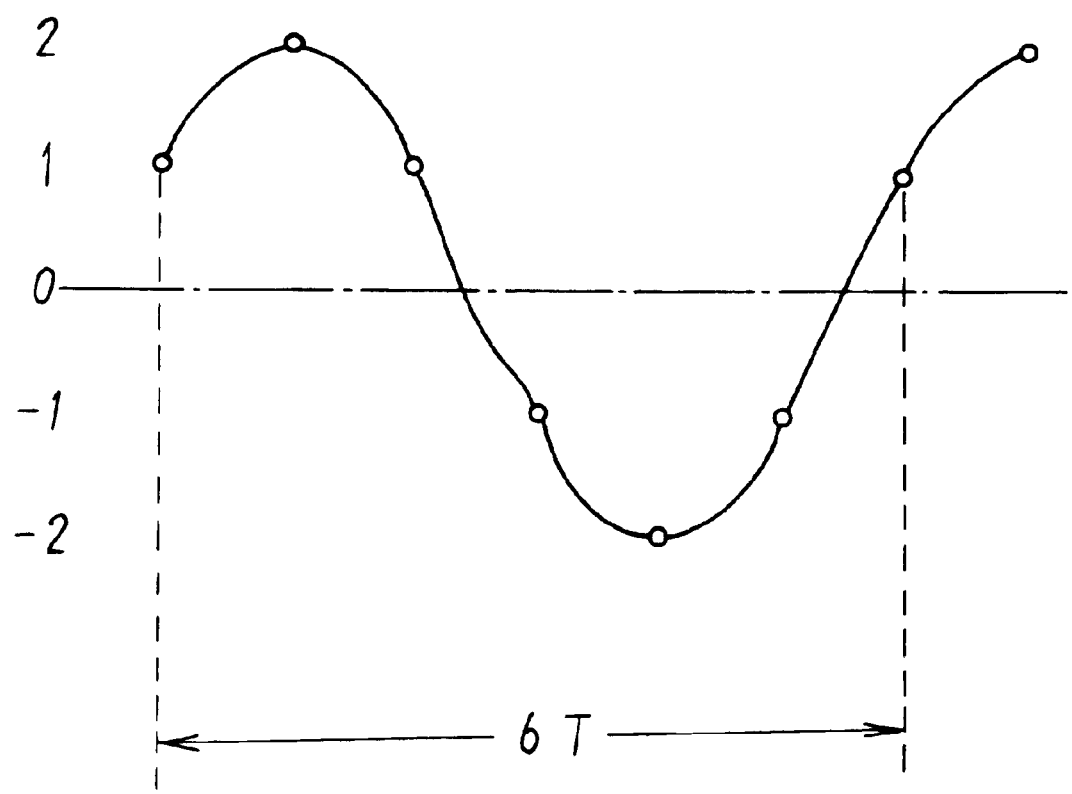
FIG. 2 is a diagram depicting a clock acquisition pattern.
Figure 3:
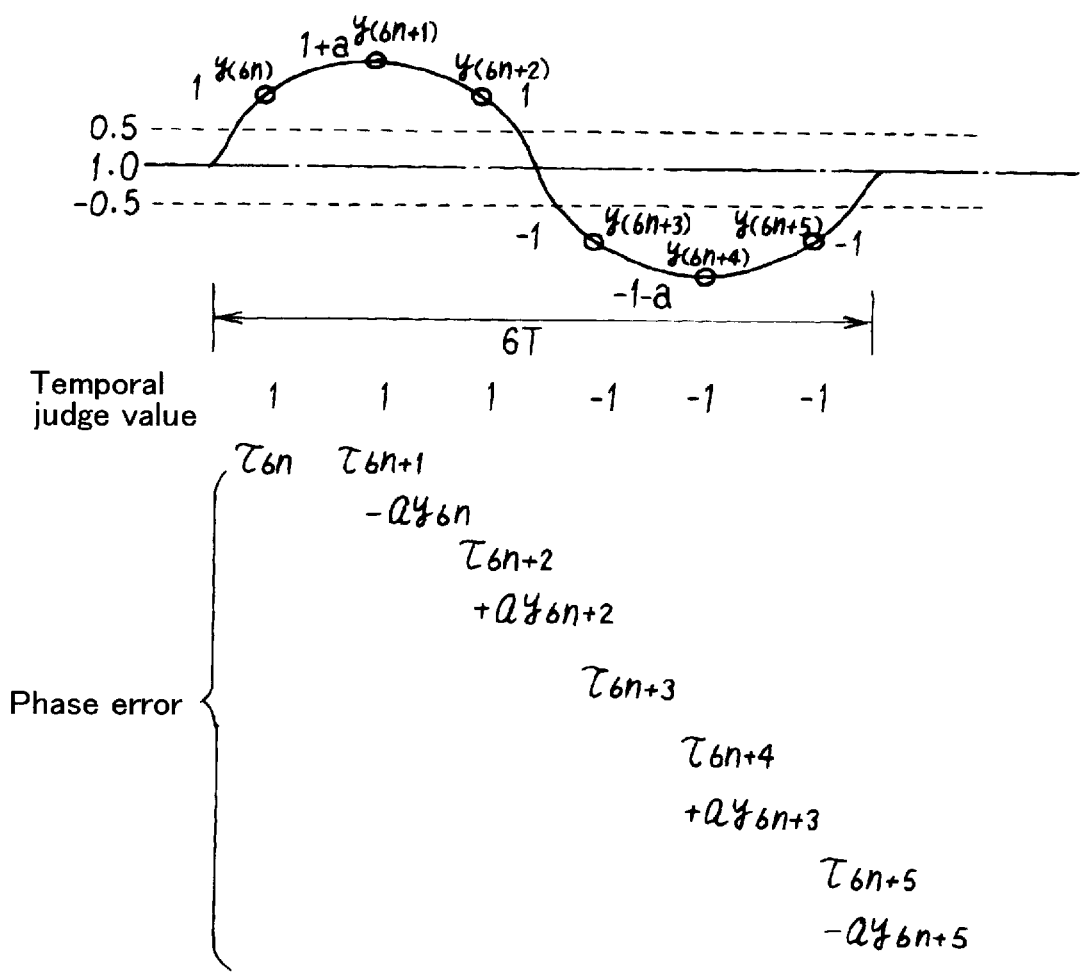
FIG. 3 is a diagram depicting the phase error computing in FIG. 1.

FIG. 1 is a block diagram depicting the read channel circuit of an embodiment of the present invention, FIG. 2 is a diagram depicting the clock acquisition pattern thereof, and FIG. 3 is a diagram depicting the phase error computing thereof.

FIG. 1 is a block diagram of the read channel of (1, 7) EEPR4ML. As FIG. 1 shows, the recording data that is read from the magnetic disk by the magnetic head is input to the equalizer 1 via the gain control amplifier (not illustrated). The equalizer 1 executes extended partial response equalization $(1+2D+D^2)$. The equalizer 1 equalizes the secondary transfer function in the middle of the final partial response equalization. In other words, when the final equalization is EEPR4, then equalization $(1+2D+D^2)$ is executed.

When the final equalization is EPR4, the equalizer 1 executes equalization $(1+2D+D^2)$, and when the final equalization is MMEEPR4, the equalizer 1 executes equalization $(1+1.5D+D^2)$. In a general formula, the equalizer 1 executes equalization $(1+(1+a)D+D^2)$. Here $a \geq 0$.

Figure 20:
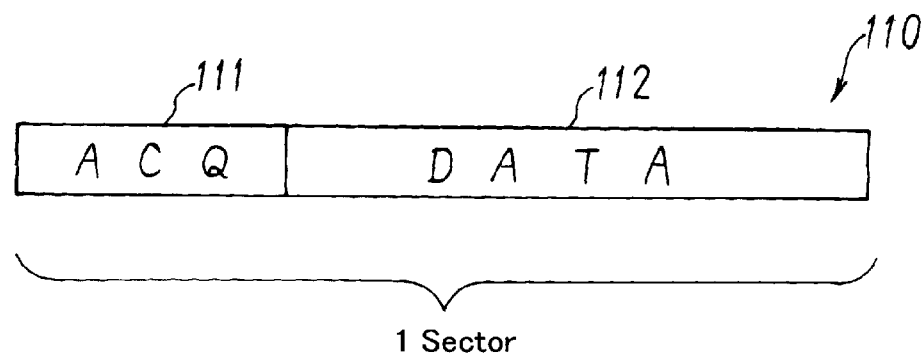
FIG. 20 is a diagram depicting a configuration of a sector.
Figure 21:
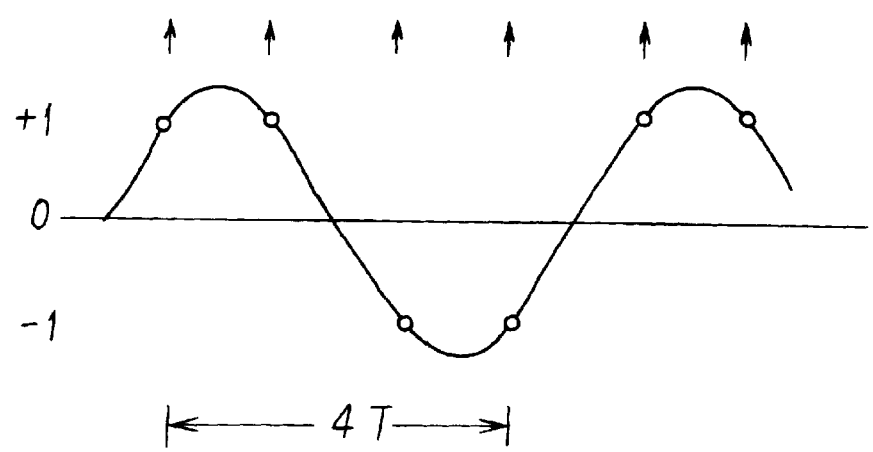
FIG. 21 is a diagram depicting a conventional acquisition pattern.

Now a clock acquisition pattern written in the acquisition area will be described with reference to FIG. 2. In the acquisition area 111 of the sector of the magnetic disk described in FIG. 20, the pattern of repeating "100" is written as the clock acquisition pattern by (1, 7) RLL codes.

By reading this clock acquisition pattern from the magnetic disk and equalizing it by the equalizer 1, a 6T period signal is obtained, as shown in FIG. 2. The equalizer 1 executes $(1+2D+D^2)$ equalization, so the signal has a sine wave having 2, 1, −1 and −2 states.

The period 6T of this signal is longer than a conventional 4T pattern, so the amplitude level does not drop very much even if the track recording density is increased. Therefore, the phase error can be accurately obtained from the amplitude.

In FIG. 1, the sampler 2 samples the equalization output according to the clock. For the sampler 2, normally an analog/digital converter is used.

The first temporal judgment unit 3 temporarily judges the sample output to be one of two values (1, −1). It is preferable for the first temporal judgment unit 3 to be composed of a comparison circuit which compares sample output y and the 0 volt threshold value. The second temporal judgment unit 4 judges sample output to be one of five values (2, 1, 0, −1, −2). It is also preferable for the second temporal judgment unit 4 to be composed of a similar comparison circuit.

The phase error-computing unit 5 computes the phase error τ from the temporal judgment value X and the sample output y. The phase error-computing unit 5 computes the phase error τ by the known Dolivo formula shown below.

$$\tau(n)=y(n-1)\cdot X(n)-y(n)\cdot X(n-1)$$

Here y(n) is a sample output value (amplitude value) with the current sample, y (n−1) is a sample output value (amplitude value) with the previous sample, X (n) is a judgment value with the current sample, and X (n−1) is a judgment value with the previous sample.

The phase error computing unit 5 comprises a first delay element (register) 20 which delays the sample output for one sample, a second delay element (register) 21 which delays the judgment value for one sample, a first multiplier 22 which multiplies the delayed sample output Y (n−1) by the judgment value X (n), a second multiplier 23 which multiplies the sample output Y (n) by the delayed judgment value X (n−1), and an adder 24 which subtracts the multiplication result of the second multiplier 23 from the multiplication result of the first multiplier 22.

The first switch 13 connects the first temporal judgment unit 3 to the phase error computing unit 5 at acquisition, and connects the second temporal judgment unit 4 to the phase error computing unit 5 at tracking.

The 3-bit adder 6 holds the phase error τ for three samples, and adds the phase error for three samples. As FIG. 3 shows, the equalization signal of the acquisition pattern is a repeat pattern of 1, 1+a, 1, −1, −1−a and −1. In the temporal judgment, 1+a and 1 and −1 and −1−a are not distinguished. Therefore, the temporal judgment values are 1, 1, 1, and −1, −1, −1. In the case of EEPR4 in FIG. 1, 'a' is "1", and FIG. 3 shows the extended partial response in a broad sense, so a general formula using "a" is used.

Therefore an error occurs to phase error computing. This error can be cancelled since the acquisition pattern is a repeat of "100" and the 6T pattern. In other words, using the above mentioned formula for phase error, phase errors τ(6n)–τ(6n+5) at each sample time, from 6n to 6n+5, are calculated.

Phase error τ(6n) at 6n is given by the following formula.

$$\tau(6n)=y(6n-1)\cdot X(6n)-y(6n)\cdot X(6n-1) \quad (1)$$

Since X (6n) is "1" and X (6n−1) is "−1", the formula (1) is transformed to the following formula (2).

$$\tau(6n)=y(6n-1)+y(6n) \quad (2)$$

This formula is transformed to the following formula (3), which indicates normal phase comparison.

$$y(6n-1)-y(6n)(-1)=\tau(6n) \quad (3)$$

Then the phase error τ(6n+1) of (6n+1) is given by the following formula.

$$\tau(6n+1)=y(6n)\cdot X(6n+1)-y(6n+1)\cdot X(6n) \quad (4)$$

Since X (6n) is "1" and X (6n+1) is "1+a", the formula (4) is transformed to the formula (5).

$$\tau(6n+1)=y(6n)\cdot(1+a)-y(6n+1) \quad (5)$$

This formula (5) is transformed to the formula (6), which indicates normal phase comparison.

$$Y(6n)-y(6n+1)=\tau(6n+1)-a\cdot y(6n) \quad (6)$$

Then the phase error τ(6n+2) of (6n+2) is given by the following formula.

$$\tau(6n+2)=y(6n+1)\cdot X(6n+2)-y(6n+2)\cdot X(6n+1) \quad (7)$$

Since X (6n+1) is "1+a" and X (6n+2) is "1", the formula (7) is transformed to the formula (8).

$$\tau(6n+2)=y(6n+1)-y(6n+2)\cdot(1+a) \quad (8)$$

This formula (8) is transformed to formula (9), which indicates normal phase comparison.

$$y(6n+1)-y(6n+2)=\tau(6n+2)+a\cdot y(6n+2) \quad (9)$$

To add the phase errors for three samples before and after, the formula (3), formula (6) and formula (9) are added. The formula (10) is obtained as a result.

$$y(6n-1)-2\cdot y(6n+1)+y(6n+2)=\tau(6n)+\tau(6n+1)-a\cdot y(6n)+\tau(6n+2)+a\cdot y(6n+2) \quad (10)$$

Here, y (6n)=y (6n+2) in the above mentioned equalization signal of the repeat pattern, as shown in FIG. 3, so the formula (10) becomes the following formula (11).

$$y(6n-1)-2\cdot y(6n+1)+y(6n+2)=\tau(6n)+\tau(6n+1)+\tau(6n+2) \quad (11)$$

In other words, the phase computing error a·y (6n) and a·y (6n+2) due to a temporal judgment are cancelled. Therefore, a phase error, where the phase computing error is cancelled, can be obtained by adding three samples.

Then the phase error τ (6n+3) of (6n+3) is given by the following formula.

$$\tau(6n+3)=y(6n+2)\cdot X(6n+3)-y(6n+3)\cdot X(6n+2) \quad (12)$$

Since X (6n+2) is "1" and X (6n+3) is "−1", the formula (12) is transformed to the formula (13).

$$\tau(6n+3)=-y(6n+2)-y(6n+3) \quad (13)$$

This formula (13) is transformed to the formula (14), which indicates normal phase comparison.

$$(-1)\cdot y(6n+2)-y(6n+3)=\tau(6n+3) \quad (14)$$

To add the phase errors for three samples before and after, the formula (6), formula (9) and formula (14) are added. The formula (15) is obtained as a result.

$$y(6n)-2\cdot y(6n+2)+y(6n+3)=\tau(6n+1)-a\cdot y(6n)+\tau(6n+2)+a\cdot y(6n+2)+\tau(6n+3) \quad (15)$$

Here, y (6n)=y (6n+2) in the above mentioned equalization signal of the repeat pattern as shown in FIG. 3, so the formula (15) becomes the following formula (16).

$$Y(6n)-2\cdot y(6n+2)+y(6n+3)=\tau(6n+1)+\tau(6n+2)+\tau(6n+3) \quad (16)$$

By doing this, the phase computing errors a·y (6n) and a·y (6n+2) due to a temporal judgment are cancelled. Therefore, a phase error, where the phase computing error is cancelled, can be obtained by adding three samples.

Then the phase error τ (6n+4) of (6n+4) is given by the following formula.

$$\tau(6n+4)=y(6n+3)\cdot X(6n+4)-y(6n+4)\cdot X(6n+3) \quad (17)$$

Since X (6n+3) is "−1" and X (6n+4) is "−1−a", the formula (17) is transformed to the formula (18)

$$\tau(6n+4)=(-1-a)\cdot y(6n+3)-(-1)\cdot y(6n+4) \quad (18)$$

This formula (18) is transformed to the formula (19), which indicates normal phase comparison.

$$(-1)\cdot y(6n+3)-(-1)\cdot y(6n+4)=\tau(6n+4)+a\cdot y(6n+3) \quad (19)$$

To add the phase errors for three samples before and after, the formula (9), formula (14) and formula (19) are added. The formula (20) is obtained as a result.

$$y(6n+1)-2\cdot y(6n+3)+y(6n+4)=\tau(6n+2)+a\cdot y(6n+2)+\tau(6n+3)+\tau(6n+4)+a\cdot y(6n+3) \quad (20)$$

Here, y (6n+2)=−y (6n+3) in the above mentioned equalization signal of the repeat pattern as shown in FIG. 3, so the formula (20) becomes the following formula (21).

$$y(6n+1)-2\cdot y(6n+3)+y(6n+4)=\tau(6n+2)+\tau(6n+3)+\tau(6n+4) \quad (21)$$

By doing this, the phase computing errors a·y (6n+2) and a·y (6n+3) due to a temporal judgment are cancelled. Therefore a phase error, where the phase computing error is cancelled, can be obtained by adding three samples.

Then the phase error τ(6n+5) of (6n+5) is given by the following formula.

$$\tau(6n+5)=y(6n+4)\cdot X(6n+5)-y(6n+5)\cdot X(6n+4) \quad (22)$$

Since X (6n+4) is "−1−a" and X (6n+5) is "−1", the formula (22) is transformed to the formula (23).

$$\tau(6n+5)=(-1)\cdot y(6n+4)-(-1-a)\cdot y(6n+5) \quad (23)$$

This formula (23) is transformed to the formula (24), which indicates normal phase comparison.

$$(-1)\cdot y(6n+4)-(-1)\cdot y(6n+5)=\tau(6n+5)-a\cdot y(6n+5) \quad (24)$$

To add the phase errors for three samples before and after, the formula (14), formula (19) and formula (24) are added. The formula (25) is obtained as a result.

$$y(6n+2)-2\cdot y(6n+4)+y(6n+5)=\tau(6n+3)+\tau(6n+4)+a\cdot y(6n+3)+\tau(6n+5)-a\cdot y(6n+5) \quad (25)$$

Here, y (6n+3)=y (6n+5) in the above mentioned equalization signal of the repeat pattern as shown in FIG. 3. The formula (25) becomes the following formula (26).

$$y(6n+2)-2\cdot y(6n+4)+y(6n+5)=\tau(6n+3)+\tau(6n+4)+\tau(6n+5) \quad (26)$$

By doing this, the phase computing errors a·y (6n+3) and a·y (6n+5) due to a temporal judgment are cancelled. Therefore a phase error, where the phase computing error is cancelled, can be obtained by adding three samples.

In FIG. 1, the 3-bit adder 6 comprises a first register 25 which delays the phase error for one sample, a second register 26 which delays the phase error of the first register 25 for one sample, a third register 27 which delays the phase error of the second register 26 for one sample, and an adder 28 which adds the phase errors of the three registers 25, 26 and 27.

The loop filter 7 smoothes the phase error. And the voltage control oscillator (VCO) 8 generates clocks at a frequency (phase) according to the output of the loop filter 7. This clock is used as a sample clock of the sampler 2.

The second switch 14 connects the adder 28 to the loop filter 7 at acquisition, and connects the adder 24 to the loop filter 7 at tracking.

The (1+D) equalizer 9 executes (1+D) equalization on the output of the sampler 2. The (1+D) equalizer 9 has an adder 15 which adds the input and the output of the register 20 of the phase error computing unit 5. The maximum-likelihood detector 10 detects the maximum-likelihood value after the output of the (1+D) equalizer 9 is judged to be one of five values. In this maximum-likelihood detector 10, five values are judged, and an error can be corrected by maximum-likelihood detection.

Figure 17:
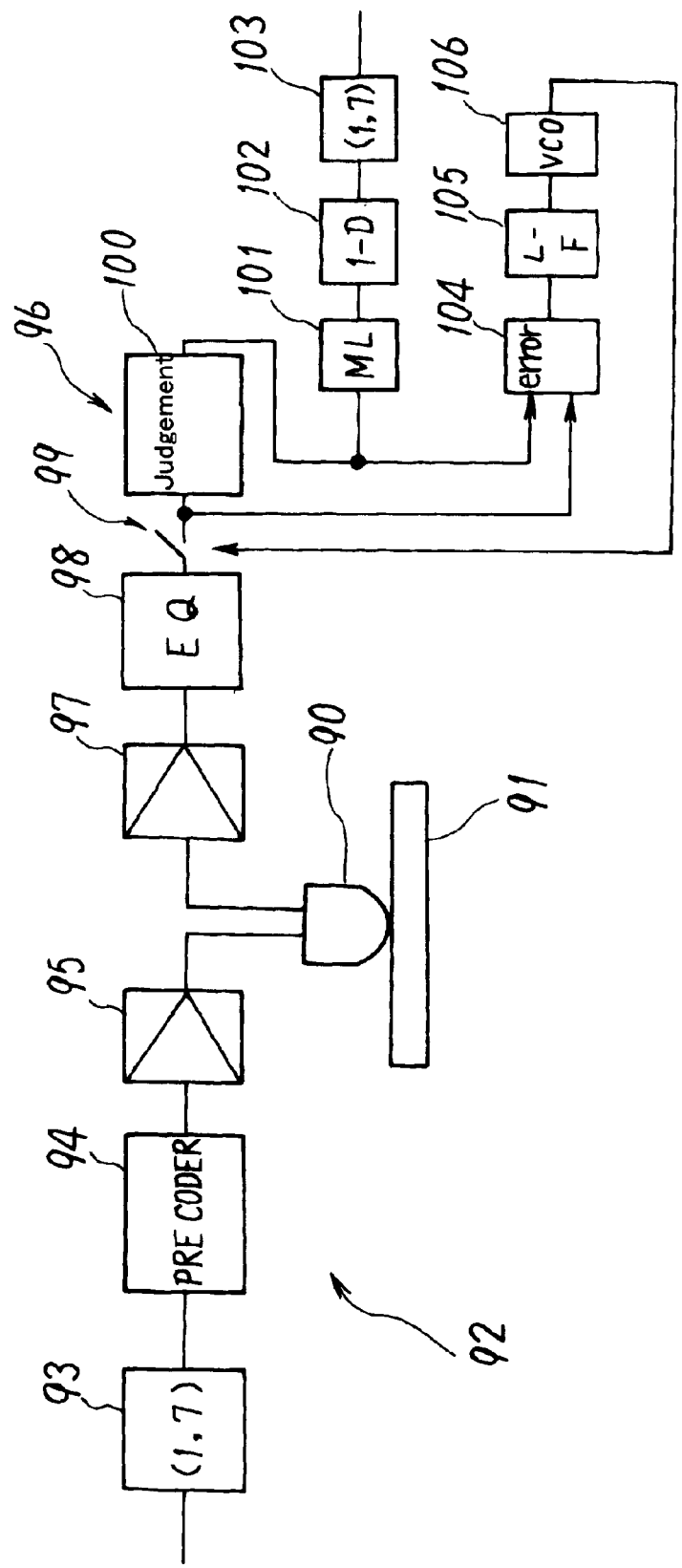
FIG. 17 is a block diagram depicting prior art.
Figure 18:
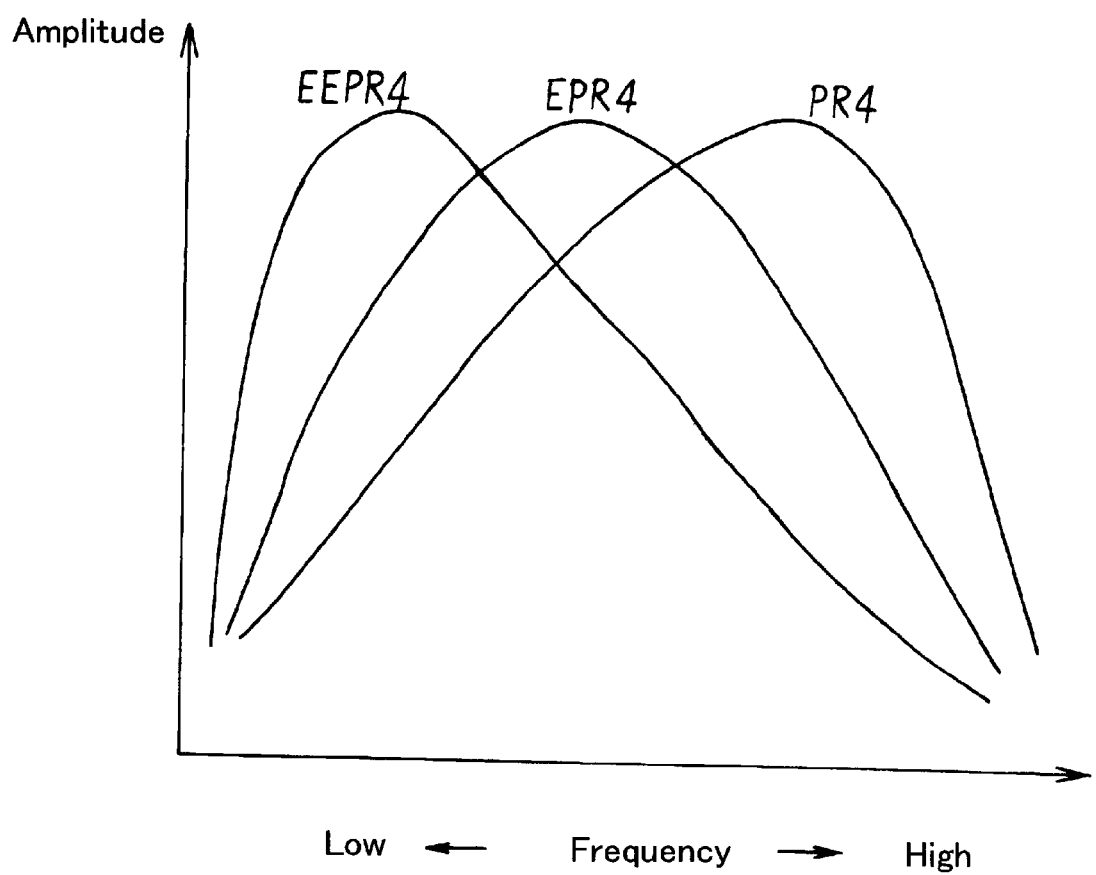
FIG. 18 is a spectrum diagram depicting a partial response.
Figure 19A:
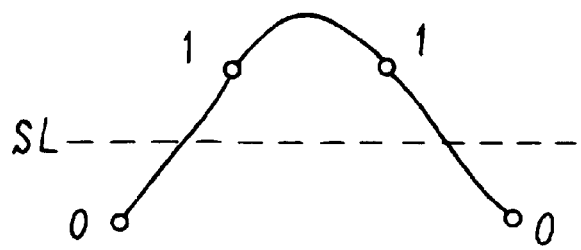
FIG. 19(A), FIG. 19(B) and FIG. 19(C) are diagrams depicting a partial response.
Figure 19B:
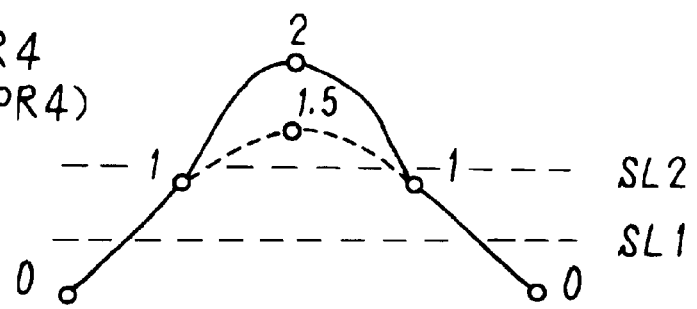
Figure 19C:
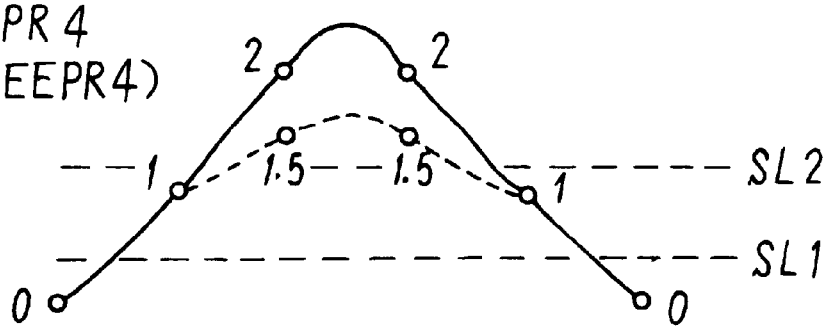

The (1−D) equalizer 11 cancels the characteristic of the pre-coder 94 (FIG. 17). The (1−D) equalizer 11 is comprised of a register 16, and an EXOR circuit 17, which determines exclusive OR of the input and the output of the register 16. The (1, 7) decoder 12 decodes the (1, 7) codes into original codes. By doing this, regeneration data can be obtained.

In this way, acquisition signals with sufficient amplitude can be obtained in the (1, 7) encoding extended partial response regeneration system by using a pattern of repeating "100" for the acquisition pattern. Therefore an accurate phase error can be computed, even if the phase error is computed from the amplitude.

Also, a phase computing error can be cancelled by adding the phase errors of three samples, even if the number of states is decreased for phase error computing by temporal judgment to be one of two values, so the number of judgment states at acquisition can be decreased, and accurate phase error computing is possible.

Figure 4:
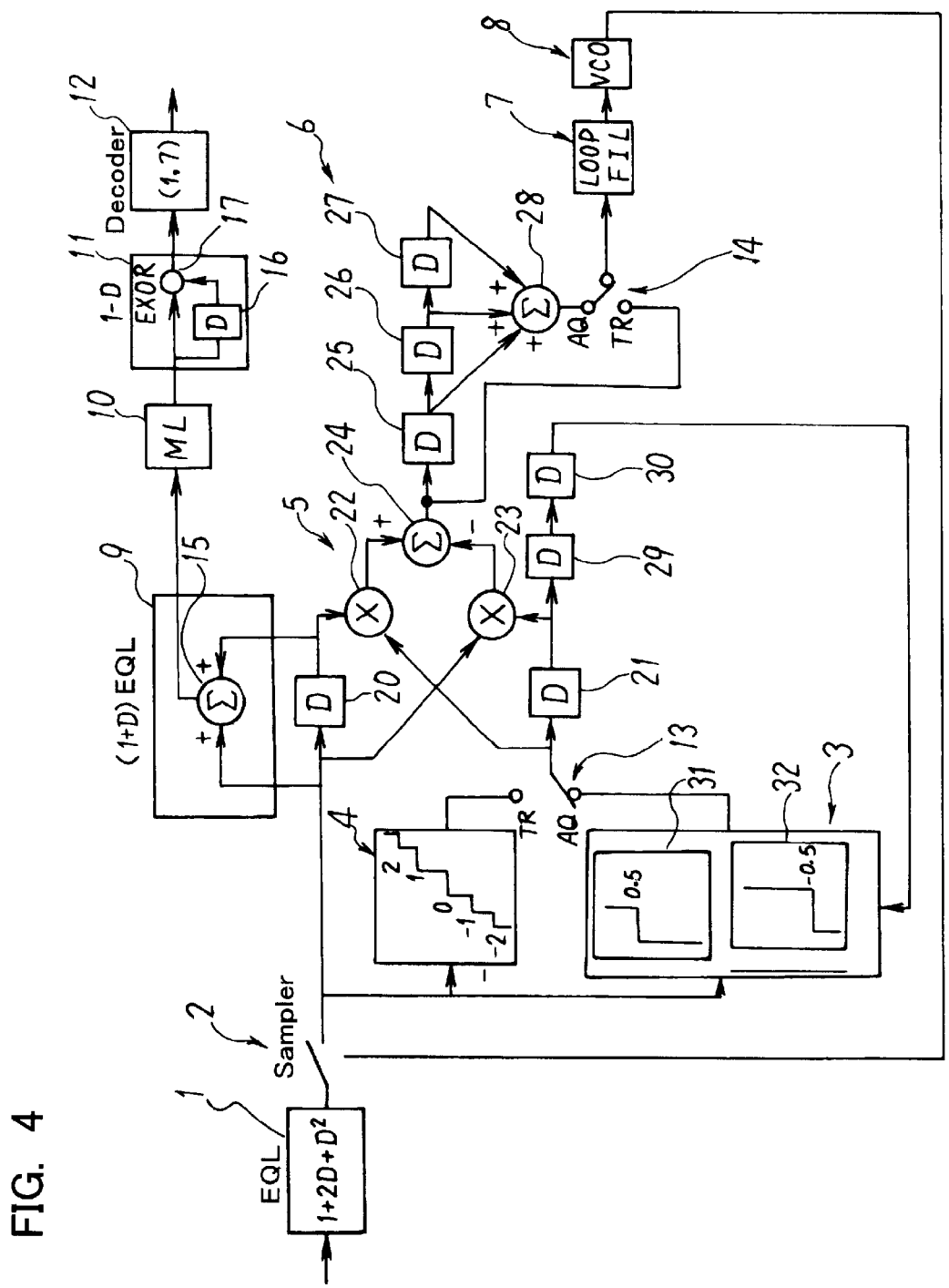
FIG. 4 is a block diagram depicting the second embodiment of the present invention.

FIG. 4 is a block diagram depicting the read channel of the second embodiment of the present invention. FIG. 4 shows the read channel of EEPR4. In FIG. 4, the parts which are the same as FIG. 1 are denoted with the same symbols.

The temporal judgment unit 3 is comprised of a first comparator 31 which compares the first threshold value at the 0.5 level with the sample value, and a second comparator 32 which compares the second threshold value at the −0.5 level with the sample value.

The fourth register 29 delays the judgment value of the register 21 of the phase error computing unit 5 for one sample. The fifth register 30 delays the judgment value of the fourth register 29 for one sample. The output of the fifth register 30 is input to the temporal judgment unit 3. The temporal judgment unit 3 selects the comparator, 31 or 32, depending on the output of the fifth register 30.

In this embodiment, the threshold value of the temporal judgment is changed according to the temporal judgment values. As FIG. 2 and FIG. 3 show, a "100" acquisition pattern has a 6T period, so the temporal judgment values changes as "1, 1, 1, −1, −1, −1". In other words, the temporal judgment value changes at a 3T interval. Therefore, the temporal judgment value of the next sample can be estimated from the temporal judgment value at 3 samples before.

In other words, the temporal judgment value delays for three samples by three registers, 21, 29 and 30. Based on the temporal judgment value which was delayed for three samples, a threshold value of the temporal judgment unit 3 is selected. Therefore, a 0.5 threshold value is selected for a signal where the temporal judgment value of the acquisition pattern is at the "1" level, and a −0.5 threshold value is selected for a signal where the temporal judgment value is at the "−1" level.

Since the threshold value is changed while estimating the temporal judgment value, a more accurate temporal judgment is possible. As a result, an accurate phase error can be computed even if the number of judgment states is decreased.

Figure 5:
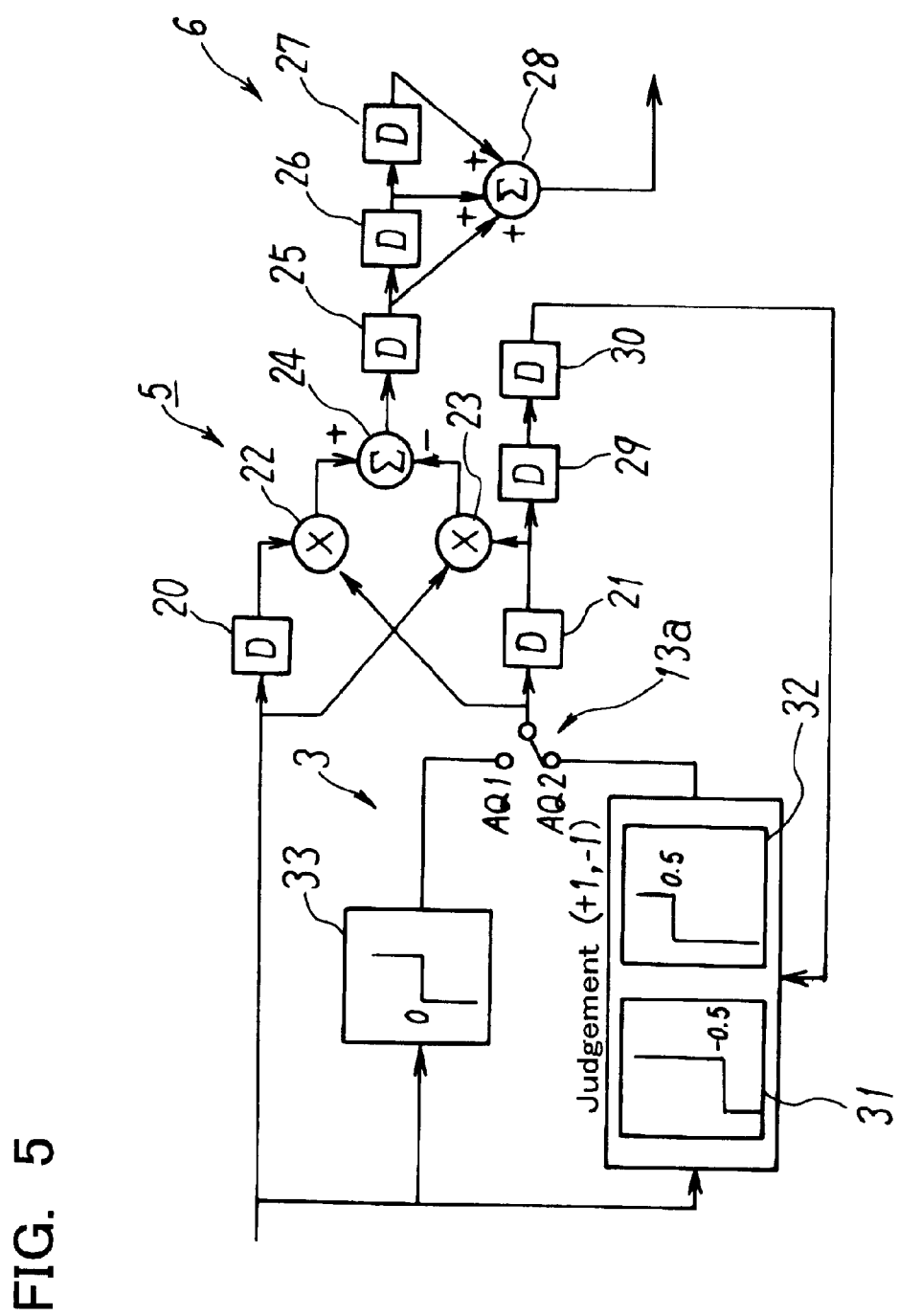
FIG. 5 is a block diagram depicting the third embodiment of the present invention.

FIG. 5 is a block diagram depicting the third embodiment of the present invention. FIG. 5 shows only the temporal judgment unit 3 of the read channel of EEPR4, the phase error computing unit 5, and the 3-bit adder 6. In FIG. 5, the parts which are the same as in FIG. 4 are denoted with the same symbols.

In FIG. 5, the third comparator 33 compares the sample value and the threshold value at the 0 level, and determines the temporal judgment value. The third switch 13a connects the third comparator 33 to the phase error computing unit 5 at the initialization of acquisition, and connects the first and second comparators 31 and 32 to the phase error computing unit 5 after the initialization of acquisition is over.

When the first and second comparator 31 and 32 are selected based on the temporal judgment value at three samples before, as described in FIG. 4, an initial value is required at the initialization of acquisition, since the temporal judgment value at three samples before does not exist.

In this embodiment, at the initialization of acquisition, the third switch 13a is connected to the third comparator 33, and the temporal judgment value is determined based on the threshold value at the 0 level by the third comparator 33. When the initial value is obtained, the third switch 13a is connected to the first and second comparators 31 and 32, and the threshold value is changed based on the temporal judgment value at three samples before.

Since the initial value can be obtained accurately if this method is used, a threshold value can be accurately changed according to the temporal judgment value.

Figure 6:
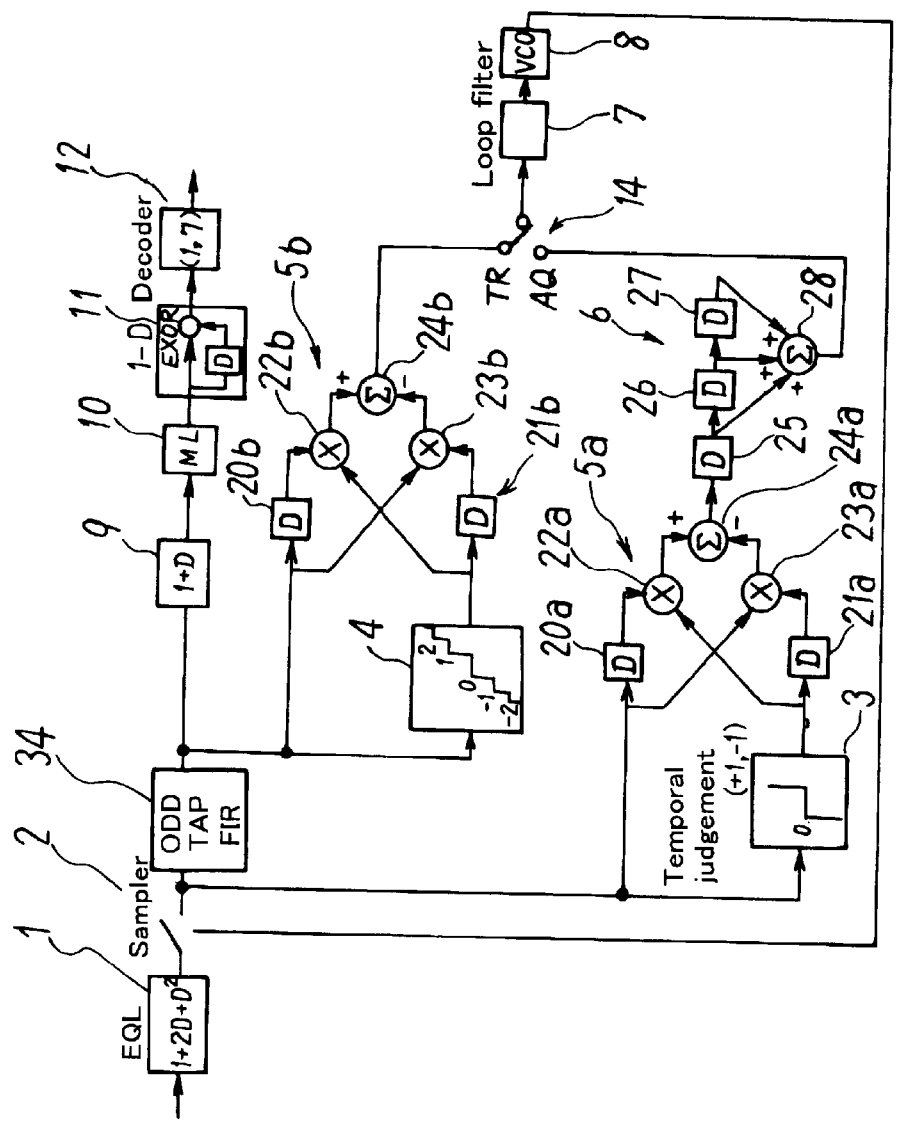
FIG. 6 is a block diagram depicting the fourth embodiment of the present invention.

FIG. 6 is a block diagram depicting the fourth embodiment of the present invention. FIG. 6 shows the read channel of EEPR4, where the parts which are the same as FIG. 1 are denoted with the same symbols.

In FIG. 6, the FIR (Finite Impulse Response) filter 34 is comprised of a filter with an odd number of taps. The FIR filter 34 is disposed to compensate the equalization characteristic of the equalizer 1. The phase error computing unit is comprised of a first phase error computing unit 5a, which computes a phase error at acquisition, and a second phase error computing unit 5b, which computes a phase error at tracking.

The first phase error computing unit 5a is comprised of two registers, 20a and 21a, two multipliers, 22a and 23a, and an adder 24a, just like the phase error computing unit 5 shown in FIG. 1. The second phase error computing unit 5b is comprised of two registers, 20b and 21b, two multipliers, 22b and 23b, and an adder 24b, just like the phase error computing unit 5 shown in FIG. 1.

In this embodiment, where the FIR filter 34 with an odd number of taps is disposed, the input of the FIR filter 34 becomes the input for phase error judgment at acquisition, and the output of the FIR filter 34 becomes the input for phase error judgment at tracking.

Figure 7:
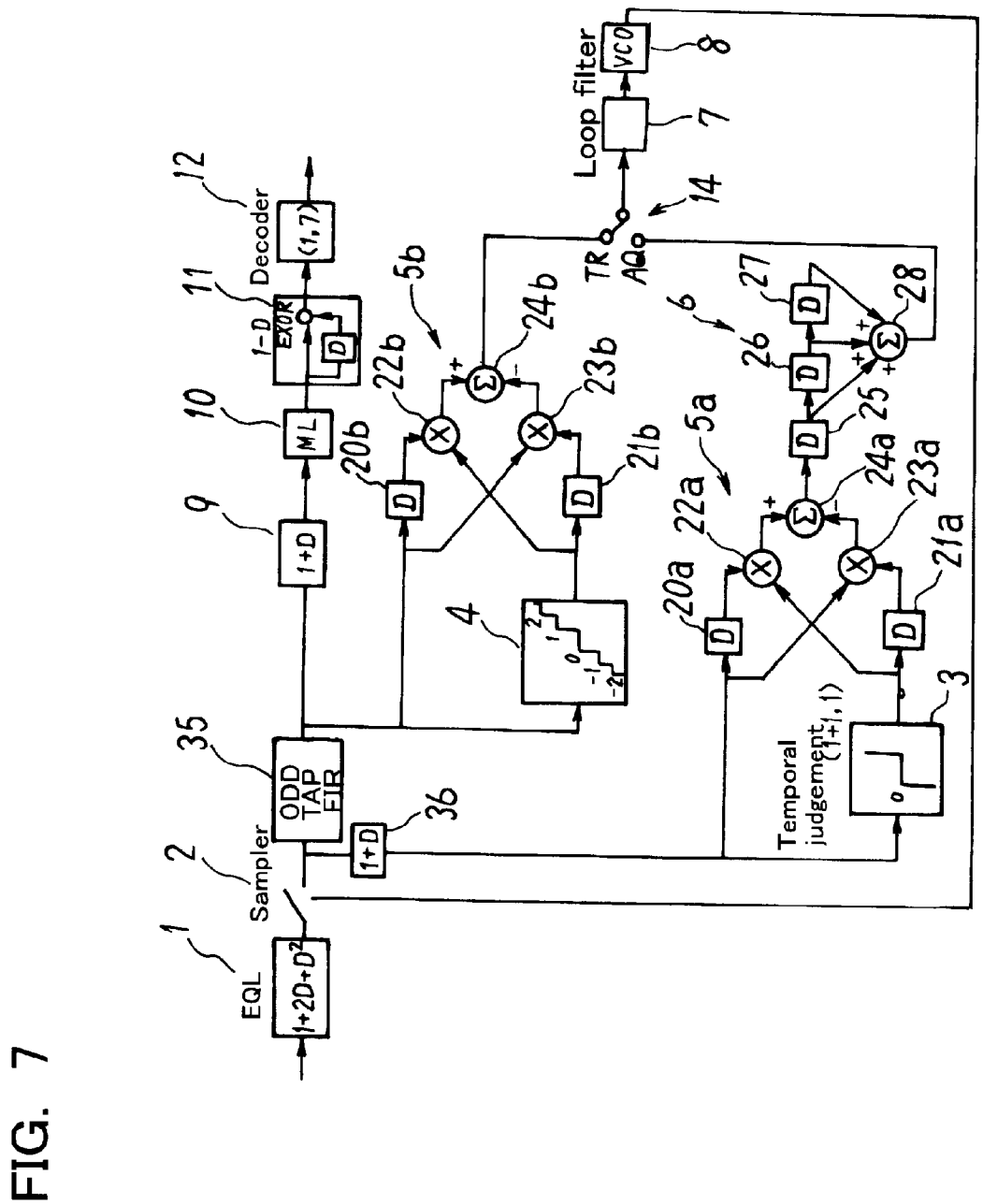
FIG. 7 is a block diagram depicting the fifth embodiment of the present invention.

FIG. 7 is a block diagram depicting the fifth embodiment of the present invention. FIG. 7 shows the read channel of EEPR4, where the parts which are the same as FIG. 1 and FIG. 6 are denoted with the same symbols.

In FIG. 7, the FIR (Finite Impulse Response) filter 35 is comprised of a filter with an even number of taps. The FIR filter 35 is disposed to compensate the equalization characteristic of the equalizer 1. The (1+D) equalizer 36 executes (1+D) equalization for the output of the sampler 2, and inputs the result to the phase error computing unit 5a at acquisition.

The phase error computing unit is comprised of a first phase error computing unit 5a, which computes a phase error at acquisition, and a second phase error computing unit 5b, which computes a phase error at tracking. In other words, the first phase error computing unit 5a is comprised of two registers, 20a and 21a, two multipliers, 22a and 23a, and an adder 24a, just like the phase error computing unit 5 shown in FIG. 1. The second phase error computing unit 5b is comprised of two registers, 20b and 21b, two multipliers 22b and 23b, and an adder 24b, just like the phase error computing unit 5b shown in FIG. 1.

In this embodiment, where the FIR filter 35 with an even number of taps is disposed, the input of the FIR filter 35 becomes the input for the phase error judgment at acquisition, and the output of the FIR filter 35 becomes the input for the phase error judgment at tracking. And in the case of the FIR filter 35 with an even number of taps, one sample of phase difference is generated for input and output, so the (1+D) equalizer 36 is disposed to compensate the phase difference.

Figure 8:
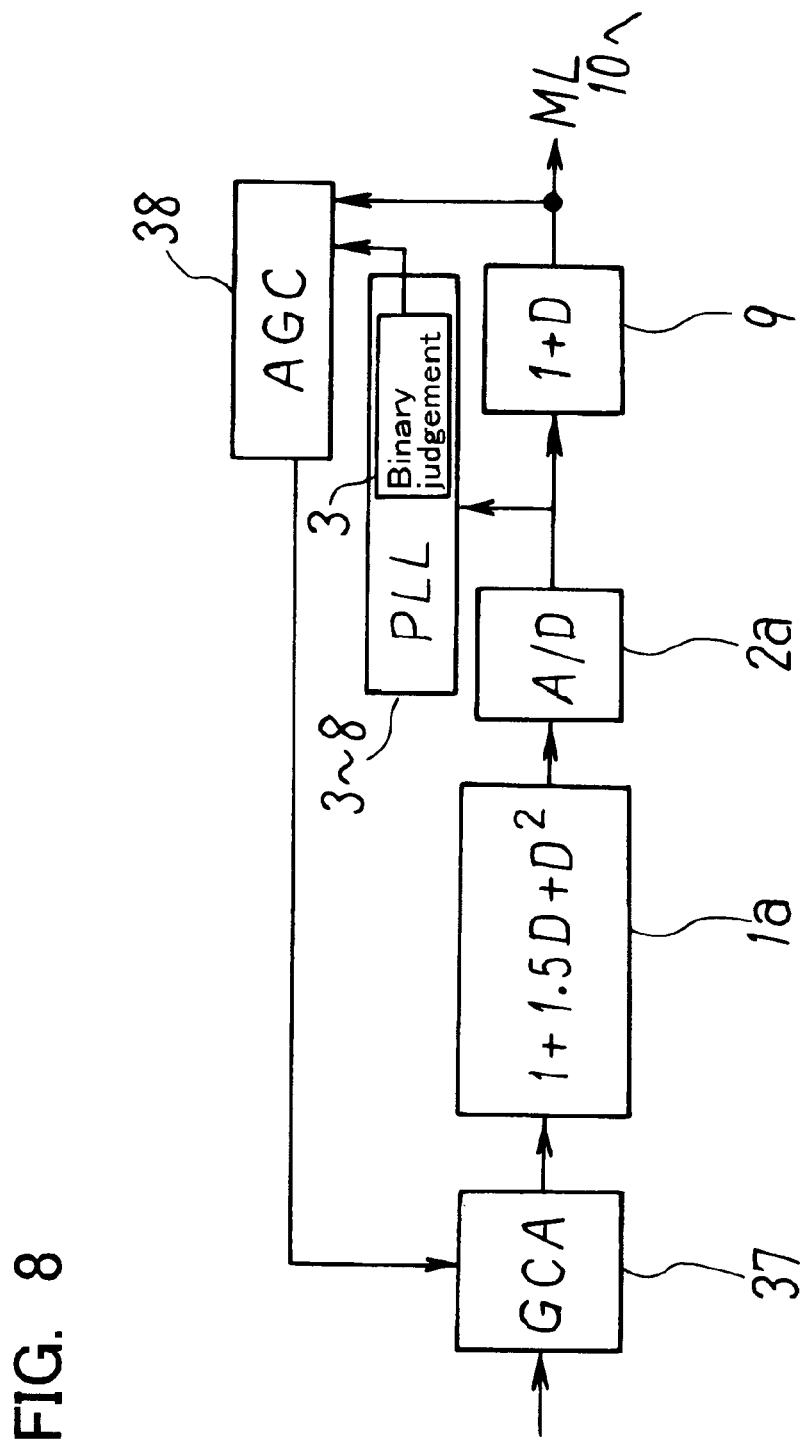
FIG. 8 is a block diagram depicting the sixth embodiment of the present invention.
Figure 9:
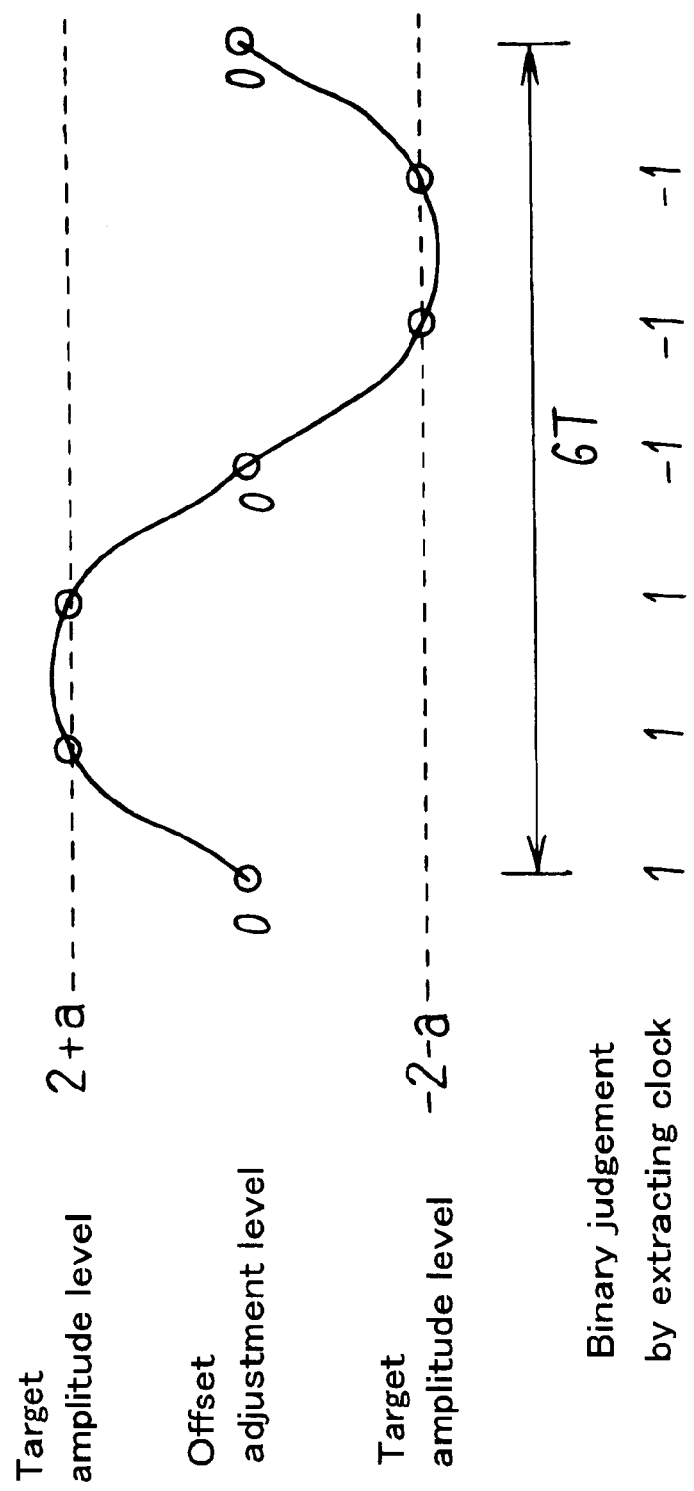
FIG. 9 is a diagram depicting an operation of the embodiment in FIG. 8.

FIG. 8 is a block diagram depicting the sixth embodiment of the present invention, and FIG. 9 is a diagram depicting the operation of the embodiment in FIG. 8. FIG. 8 shows a part of the read channel circuit of MMEPR4. In FIG. 8, the parts which are the same as FIG. 1 are denoted with the same symbols.

In FIG. 8, the gain control amplifier 37 controls amplitude so that the amplitude of the read output of the magnetic head 90 becomes a constant. The extended partial response equalizer 1 is comprised of an equalizer 1a, which has the equalization characteristic of $(1+1.5D+D^2)$. The equalizer 1a executes $(1+1.5D+D^2)$ equalization for the output of the gain control amplifier 37.

The sampler 2 is comprised of an analog/digital converter 2a. The analog/digital converter 2a converts the output of the equalizer 1a to a digital value. For the output of the analog/digital converter 2a, the (1+D) equalizer 9 described in FIG. 1 executes (1+D) equalization. And regeneration data are obtained by the maximum-likelihood detector 10, (1−D) equalizer 11 and (1, 7) decoder 12, as shown in FIG. 1.

The output of the analog/digital converter 2a is used for phase synchronization by the PLL circuits 3–8. These PLL circuits 3–8 are comprised of a first temporal judgment unit 3, a second temporal judgment unit 4, a phase error computing unit 5, a 3-bit adder 6, a loop filter 7 and a VCO 8, as described in FIG. 1.

The AGC (Automatic Gain Control) circuit 38 determines the gain of the gain control amplifier 37 from the temporal judgment value of the first temporal judgment unit 3 of the PLL circuits 3–8 and the output of the (1+D) equalizer 9.

FIG. 9 shows a waveform after the (1+D) equalizer 9 executes (1+D) equalization for the "100" acquisition pattern with a 6T period shown in the equalization waveforms in FIG. 2 and FIG. 3. As FIG. 9 shows, this waveform is a pattern of levels 0, 2+a, 2+a, 0, −2−a and −2−a in a 6T period. In MMEPR4 with $(1+1.5D+D^2)$, 'a' is "0.5".

FIG. 9 shows the relationship between this pattern and the temporal judgment value (two-value judgment value) described in FIG. 1. When the temporal judgment value indicates the same value as the temporal judgment value of the previous sample, the AGC circuit 38 detects the output level L of the (1+D) equalizer 9. The AGC circuit 38 adjusts the gain of the gain control amplifier 37 according to the difference between the target level (2+a) or (−2−a) and this output level L.

In other words, as FIG. 9 shows, if the gain has been appropriately adjusted, the output level L of the (1+D) equalizer 9 is the target amplitude level (2+a) when the temporal judgment value of the previous sample is "1" and the temporal judgment value of the current sample is "1". Also, if the gain has been appropriately adjusted, the output level L of the (1+D) equalizer 9 is the target amplitude level "−2−a" when the temporal judgment value of the previous sample is "−1" and the temporal judgment value of the current sample is "−1".

Therefore when the temporal judgment value is continuously "1" or "−1", the AGC circuit 38 adjusts the gain of the gain control circuit 37 according to the difference between the amplitude level and the target amplitude level.

In this way, the gain of the gain control circuit can be adjusted using the "100" acquisition pattern.

Figure 10:
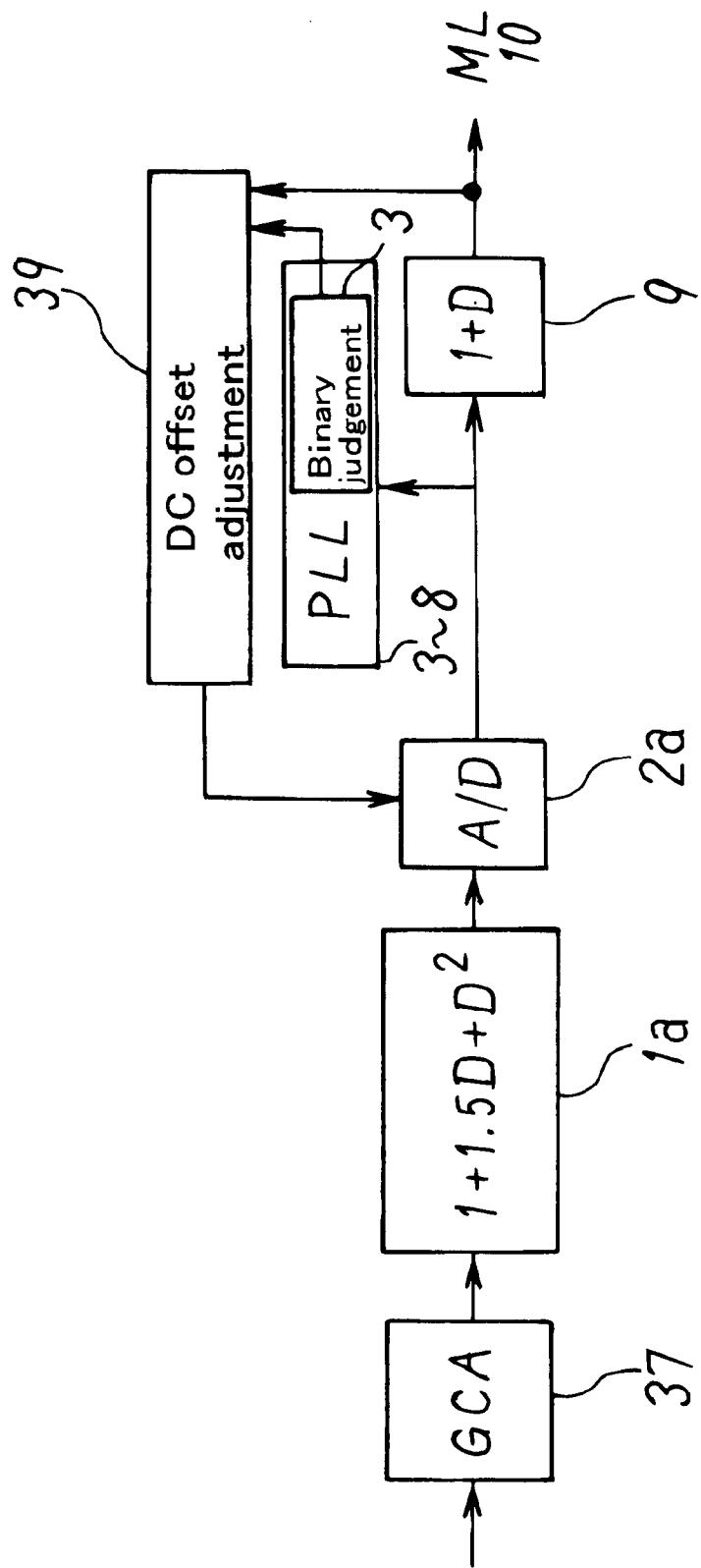
FIG. 10 is a block diagram depicting the seventh embodiment of the present invention.

FIG. 10 is a block diagram depicting the seventh embodiment of the present invention. FIG. 10 shows a read channel of MMEPR4. FIG. 10 also shows a part of a read channel circuit of MMEPR4. In FIG. 10, the parts which are the same as FIG. 1 and FIG. 8 are denoted with the same symbols.

The DC offset adjustment circuit 39 adjusts the DC offset value of the analog/digital converter 2a from the temporal judgment value of the first temporal judgment unit 3 of the PLL circuits 3–8 and the output of the (1+D) equalizer 9.

As FIG. 9 shows, in the "100" acquisition pattern with a 6T period where (1+D) equalization is executed by the (1+D) equalizer 9, the amplitude level should be "0" when the temporal judgment value changes. When the temporal judgment value changes from the temporal judgment value of the previous sample, the DC offset adjustment circuit 39 detects the output level L of the (1+D) equalizer 9. The DC offset adjustment circuit 39 adjusts the DC offset of the analog/digital converter 2a according to the difference between the target level "0" and the output level L.

In other words, as FIG. 9 shows, if the DC offset value has been appropriately adjusted, the output level L of the (1+D) equalizer 9 is the offset adjustment level "0" when the temporal judgment value of the previous sample is "−1" and the temporal judgment value of the current sample is "1". Also if the DC offset value has been appropriately adjusted, the output level L of the (1+D) equalizer 9 is the offset adjustment level "0" when the temporal judgment value of the previous sample is "1" and the temporal judgment value of the current sample is "−1".

Therefore when the temporal value changes, the DC offset adjustment circuit 39 adjusts the DC offset value of the analog/digital conversion circuit 2a according to the difference between the amplitude level and the offset adjustment level.

In this way, the DC offset value of the analog/digital converter can be adjusted using the "100" acquisition pattern.

Figure 11:
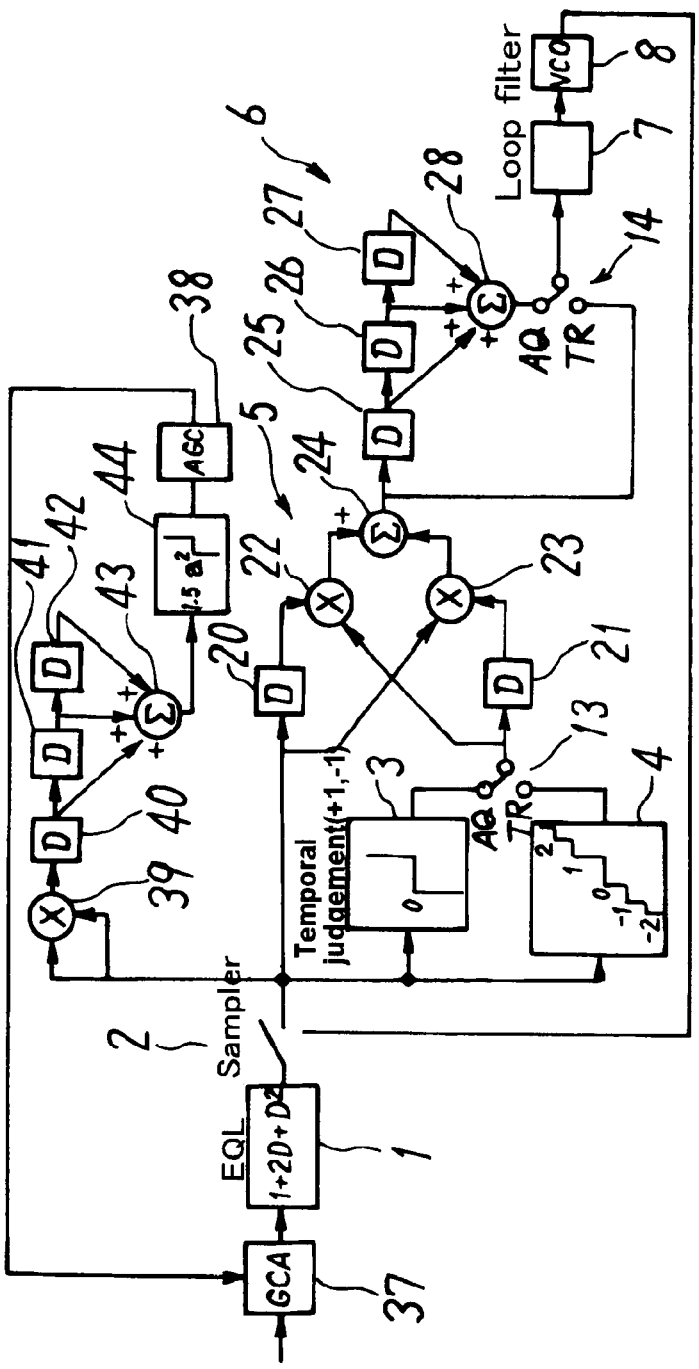
FIG. 11 is a block diagram depicting the eighth embodiment of the present invention.

FIG. 11 is a block diagram depicting the eighth embodiment of the present invention. FIG. 11 shows a part of a read channel circuit of EEPR4. In FIG. 11, the parts which are the same as FIG. 1 and FIG. 8 are denoted with the same symbols.

In this embodiment, the amplitude level is determined from the output of the sampler at acquisition so as to control amplitude. The multiplier 39 squares the output of the sampler 2. The sixth register 40 delays the output of the multiplier 39 for one sample. The seventh register 41 delays the output of the sixth register 40 for one sample. And the eighth register 42 delays the output of the seventh register 41 for one sample.

The adder 43 adds the outputs of the three registers, 40, 41 and 42. The subtraction circuit 44 subtracts a predetermined AGC adjustment level from the addition output of the adder 43 so as to compute an error. The AGC circuit 38 adjusts the gain of the gain control circuit 37 by the computed error.

In this embodiment, the result when the output of the sampler is squared is added for three samples, and the value after this addition is used. In other words, the output of the sampler is y (nT+τ). 'τ' is a phase error, and 'T' is a sample interval. After squaring the output of the sampler, the value Va, when the results are added for three samples, is given by the following formula (27).

$$Va = y(nT+\tau)^2 + y(T(n+1)+\tau)^2 + y(T(n+2)+\tau)^2 \quad (27)$$

In a "100" acquisition pattern, $$y(nT+\tau) = V \cdot \sin(\tau + \pi/6)$$

$$y(T(n+1)+\tau) = V \cdot \sin(\tau + \pi/2)$$

$$y(T(n+2)+\tau) = V \cdot \sin(\tau + 5\pi/6)$$

where V is amplitude, so when this is substituted for the formula (27), then the formula (28) is obtained.

$$Va = V^2 \sin(\tau+\pi/6)^2 + \sin(\tau+\pi/2)^2 + \sin(\tau+5\pi/6)^2 \quad (28)$$

From the formula (28), the formula (29) is obtained.

$$Va = 3V^2/2 \quad (29)$$

In other words, the phase error τ is cancelled. Amplitude is controlled for this detected amplitude value Va. In this way, amplitude can be determined even if a clock is not synchronized. Therefore the AGC adjustment can be executed before defining phase synchronization. So phase acquisition at a state where the amplitude level is at the optimum is possible.

Figure 12:
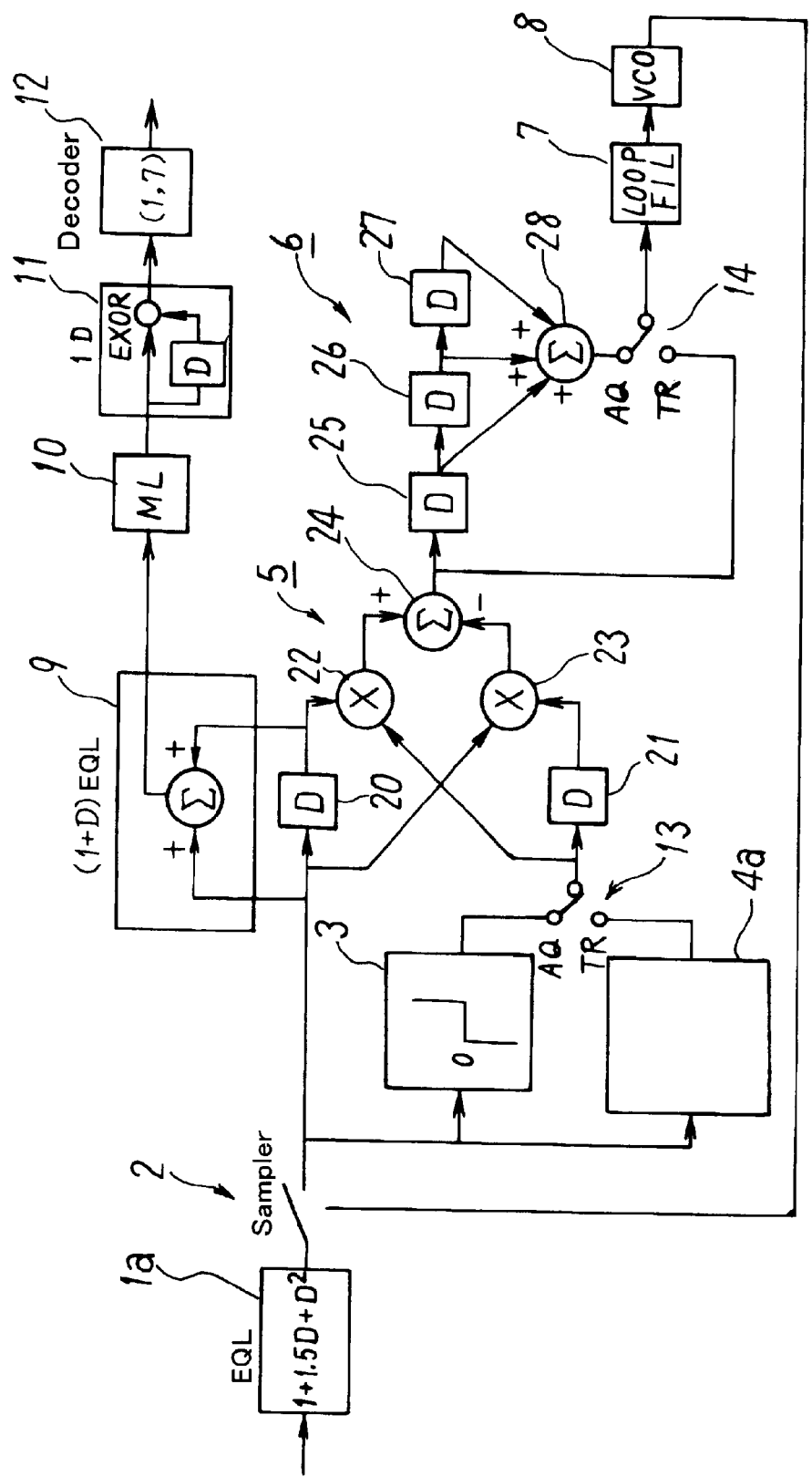
FIG. 12 is a block diagram depicting the ninth embodiment of the present invention.
Figure 13:
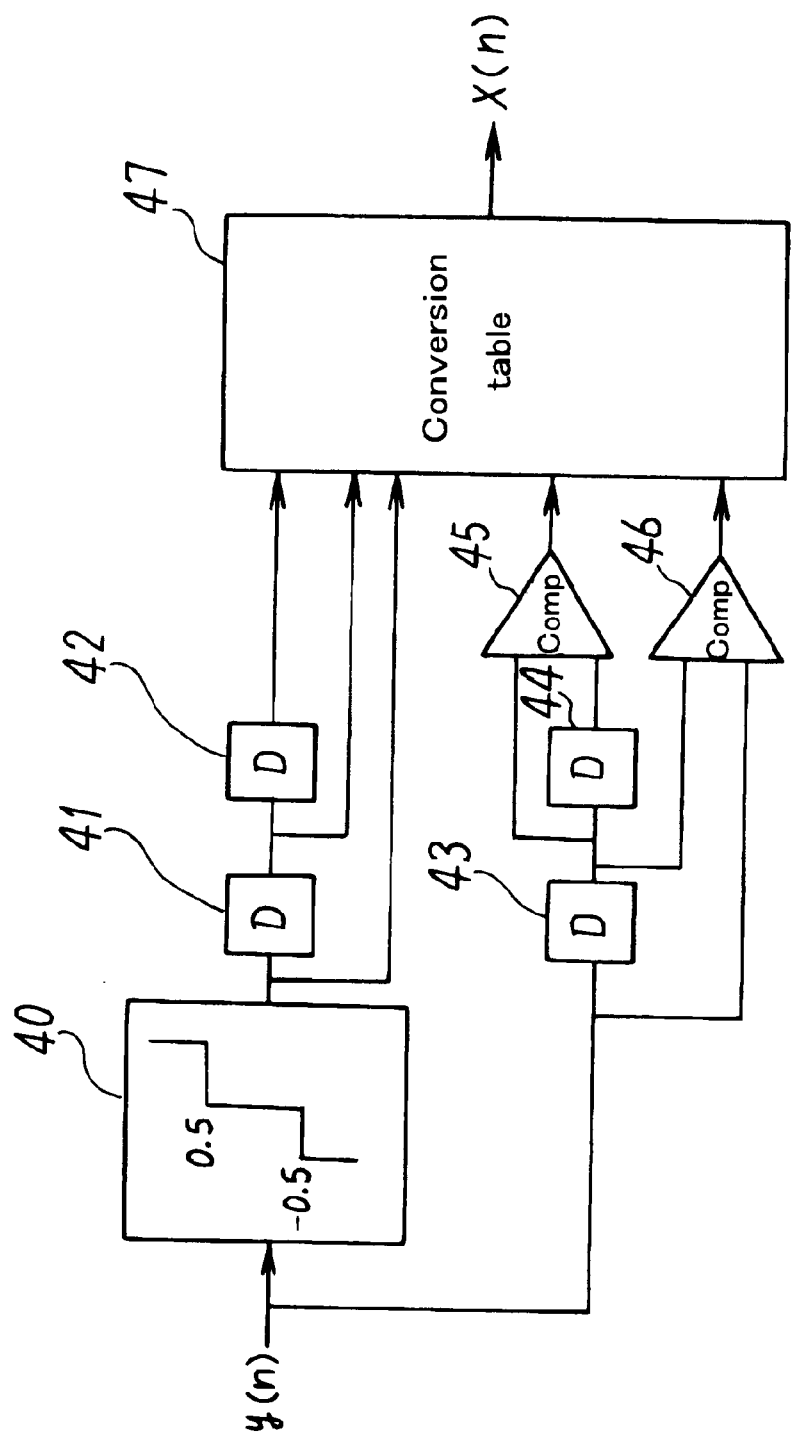
FIG. 13 is a diagram depicting a configuration of a tracking judgment unit.
Figure 15:
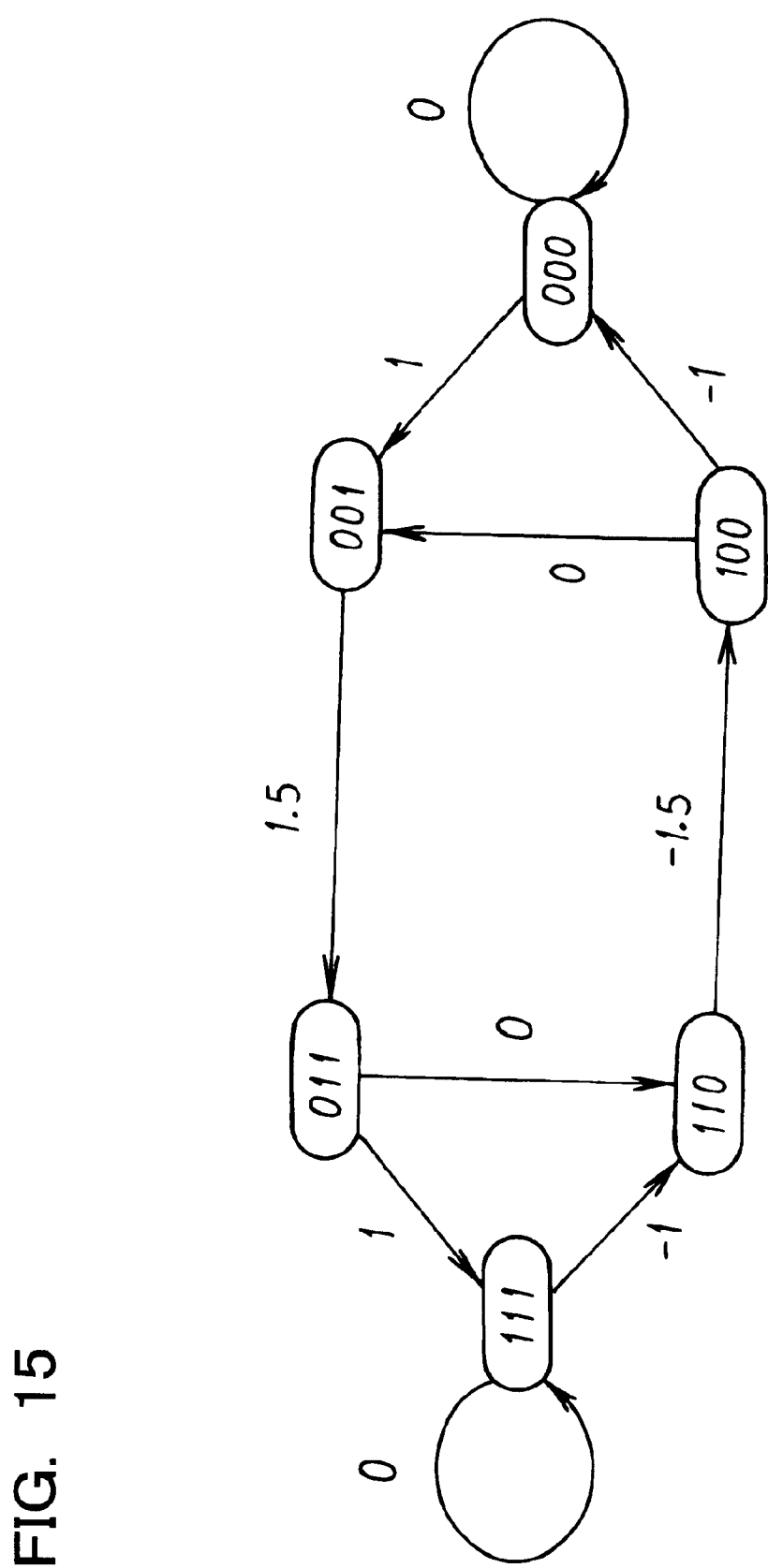
FIG. 15 is a diagram depicting the state transition for describing FIG. 14.
Figure 16:
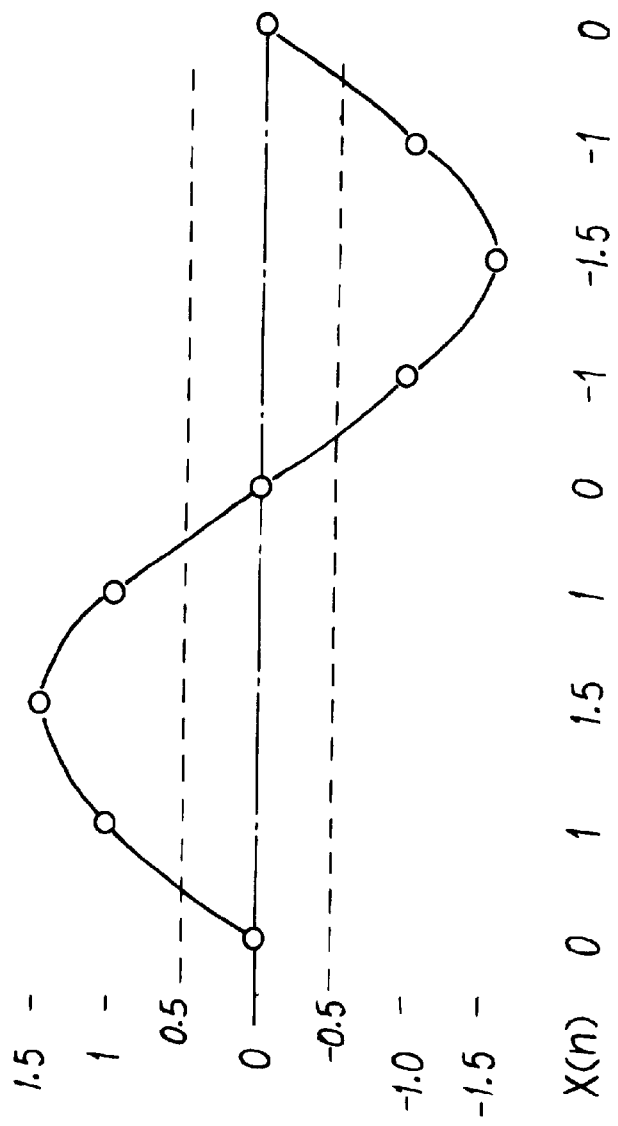
FIG. 16 is a diagram depicting the operation in FIG. 14.

FIG. 12 is a block diagram depicting the ninth embodiment of the present invention. FIG. 13 is a diagram depicting the configuration of the tracking judgment unit in FIG. 12, FIG. 14 shows the configuration of the conversion table in FIG. 13, FIG. 15 is a diagram depicting the state transition of the MMEPR4 in FIG. 14, and FIG. 16 is a diagram depicting the operation of the conversion table.

FIG. 12 shows a read channel circuit of MMEPR4. In FIG. 12, the parts which are the same as FIG. 1 are denoted with the same symbols. The $(1+1.5D+D^2)$ equalizer 1a executes $(1+1.5D+D^2)$ equalization on the read output of the magnetic head. The second temporal judgment unit 4a judges the sample output to be one of five values at tracking time from the two judgment levels and the judgment values before and after.

The tracking (second) judgment unit 2a is comprised as shown in FIG. 13. The three-value decision unit 40 compares the sample output y (n) with two threshold levels (0.5, −0.5), and temporarily judges the sample output y (n) to be one of three groups [1+a, 1], 0 and [−1, −1−a].

The register 41 delays the output of the three-value judgment unit 40 for one sample. The register 42 delays the output of the register 41 for one sample. The register 43 delays the sample output y (n) for one sample. And the register 44 delays the output of the register 43 for one sample.

The comparator 45 compares the output y (n) of the register 43 and the output y (n−1) of the register 44, and outputs the comparison result. The comparator 46 compares the sample output y (n+1) and the output y (n) of the register 43, and outputs the comparison result.

The conversion table 47 outputs the five-value judgment value based on the high/low comparison result between the result after judgment to be one of the three groups and the sample values before and after. The conversion table 47 is configured as shown in FIG. 14.

This conversion table will now be described. At first, as FIG. 15 shows, MMEPR status after the conversion of (1, 7) RLL codes by the pre-coder takes six statuses (000, 001, 011, 100, 110 and 111). FIG. 15 shows this state transition. In this state transition, the amplitude y (n) is "1.5" when the state "001" transits to state "011". At this time, the amplitude value y (n−1) of the previous sample is either the amplitude "1" when the state "000" transits to state "001", or the amplitude "0" when the state "100" transits to state "001". In the same way, the amplitude value y (n+1) of the next sample is either the amplitude "1" when the state "011" transits to state "111", or the amplitude "0" when the state "011" transits to state "110".

The amplitude y (n) is "1" when the state "011" transits to state "111". At this time, the amplitude value y (n−1) of the previous sample is the amplitude "1.5" when the state "001" transits to state "011". In the same way, the amplitude value y (n+1) of the next sample is either the amplitude "0" when the state "111" transits to state "111", or the amplitude "−1" when the state "111" transits to state "110".

This means that it is possible to judge whether the current sample is "1" or "1.5" by referring to the sample values before and after. In other words, when y (n)>0.5 and y (n−1)>0.5, the judgment value X (n) is "1+a" if y (n)≧(n−1). The judgment value X (n) is "1" if y (n)<y (n−1).

When y (n)>0.5 and y (n+1)>0.5, the judgment value X (n) is "1+a" if y (n)≧y (n+1). The judgment value X (n) is "1" if y (n)<y(n+1).

Also, if −0.5<y (n)<0.5, the judgment value X (n) is of course "0".

"−1.5" or "−1" is judged in the same way. In other words, the amplitude y (n) is "−1.5" when the state "110" transits to state "110". At this time, the amplitude value y (n−1) of the previous sample is either the amplitude "0" when the state "011" transits to state "110", or the amplitude "−1" when the state "111" transits to state "110". In the same way, the amplitude value y (n+1) of the next sample is either the amplitude "0" when the state "100" transits to state "001" or the amplitude "−1" when the state "100" transits to state "000".

When the state "100" transits to state "000", the amplitude y (n) is "−1". At this time, the amplitude value y (n−1) of the previous sample is "−1.5" when the state "100" transits to state "100". In the same way, the amplitude value y (n+1) of the next sample is either the amplitude "0" when the state "000" transits to state "000", or the amplitude "1" when the state "000" transits to state "111".

This means that it is possible to judge whether the current sample is "−1" or "−1.5" by referring to the sample values before and after. In other words, when y (n)<−0.5 and y (n−1)<−0.5, the judgment value X (n) is "−1" if y (n)≧y (n−1). The judgment value X (n) is "−1−a" if y (n)<y (n−1).

When y (n)<−0.5 and y (n+1)<−0.5, the judgment value X (n) is "−1" if y (n)≧y (n+1). The judgment value X (n) is "−1−a" if y (n)<y (n+1).

The conversion table 47 has the table shown in FIG. 14. The conversion table 47 is for a five-value judgment using the comparison result between the sample value y (n−1), y (n) and y (n+1) and each threshold value (0.5, −0.5), the high/low judgment result between the sample values y (n−1) and y (n), and the high/low judgment result between the sample values y (n) and y (n+1) as judgment conditions.

If the state transition of (1, 7) RLL codes is used as shown in FIG. 16, "1+a" and "1", and "−1−a" and "−1" can be distinguished by comparing the amplitude of the samples before and after, even if judgment is based on three groups [1+a, 1], 0, and [−1, −1−a]. Therefore the number of judgment states can be decreased at tracking. And a phase error at tracking can be accurately obtained. This is particularly effective for MMEPR where "1" and "1.5", and "−1" and "−1.5" are distinguished.

"a" is used in the above conversion table (FIG. 14) because the same conversion table can be applied to another extended partial response, such as EEPR4.

Other than the above mentioned embodiments, the following modifications are possible for the present invention.

(1) In the above embodiments, EEPR4 and MMEPR4 were described, but the present invention can also be applied to EPR4, MEPR4, MMEPR4 and MEEPR4.

(2) The read channel of a magnetic disk was used for description, but the present invention can be applied to a read channel of other recording media, such as magnetic tape and optical disk.

INDUSTRIAL APPLICABILITY

As described above, according to the present invention, the following effects are implemented.

(1) Since "100", which is one of the (1, 7) RLL codes, is used for a clock acquisition pattern, an amplitude drop due to inter-symbol interference is low even if the track recording density is high. A clock can therefore be stably acquired because the amplitude of a regeneration signal of the acquisition pattern is sufficient.

(2) The sample output is temporarily judged to be [one of] (1, −1), and the phase error computing results for three samples (symbols) are added to cancel the errors of phase computing. Therefore, the number of judgment states can be decreased, and the phase can be acquired at high-speed even when the amplitude is not yet defined at acquisition.

(3) At tracking, the sample output is judged to be [one of] three groups, [1+a, 1], 0, and [−1, −1−a], and the state transition of [1, 7] RLL codes is used for distinguishing [1+a] and [1] and [−1] and [−1−a]. Since the number of judgment states decreases, the judgment accuracy improves. Therefore the computing errors of phase errors decreases, and phase synchronization can be executed stably.

What is claimed is:

1. A phase synchronization method for an extended partial response which synchronizes the phases after executing extended partial response equalization on recording signals read from a recording medium, comprising the steps of:

executing extended partial response equalization on said recording signals;

sampling said equalization output by clocks;

temporarily judging the sample output of a gap pattern with a 6T period (T is a sampling period) written in an acquisition area of said recording medium to be one of two values (1, −1);

computing a phase error by said temporal judgment value and said sample output;

adding said phase errors for three samples; and generating clocks with a phase according to said addition result.

2. The phase synchronization method for an extended partial response according to claim 1, wherein:

said equalization step comprises a step of equalizing the recording signals encoded by (1, 7) RLL codes; and said temporal judgment step comprises a step of temporarily judging the sample output of a "100" gap pattern to be one of two values (1, −1).

3. The phase synchronization method for an extended partial response according to claim 1, further comprising the steps of:

judging said sample output to be one of five values;

computing said phase error by said five-value judgment output and said sample output; and generating clocks with a phase according to said addition result at acquisition, and generating clocks with a phase according to said phase error at tracking.

4. The phase synchronization method for an extended partial response according to claim 1, wherein:

said method further comprises a step of retaining said temporal judgment value; and said temporal judgment step comprises the steps of;

selecting a first threshold value or a second threshold value according to said retention value; and comparing the selected threshold value and said sample output.

5. The phase synchronization method for an extended partial response according to claim 4, wherein said temporal judgment step comprises an initialization step of judging said sample output to be one of two values by the polarity of said sample output and initializing said retention value.

6. The phase synchronization method for an extended partial response according to claim 1, wherein said method further comprises:

a step of classifying said sample output into three groups of temporal judgment values [1+a, 1], [0] and [−1, −1−a]; and a judgment step of judging said sample output to be one of five values from the high/low relationship with sample outputs before and after said sample output and temporal judgment values of said classified three groups;

and wherein said error computing step comprises a step of computing a phase error from said temporal judgment value and said sample output at acquisition, and a step of computing a phase error from said five-value judgment value and said sample output at tracking; and said clock generation step comprises:
- a step of generating clocks with a phase according to said addition result at said acquisition; and
- a step of generating clocks with a phase according to said phase error at said tracking.

7. A phase synchronization method for an extended partial response which synchronizes phases after executing an extended partial response equalization on recording signals read from a recording medium, comprising:
- a step of executing an extended partial response equalization on said recording signals;
- a step of sampling said equalization output by clocks;
- a step of classifying said sample output into three groups of temporal judgment values, [1+a, 1], 0, and [−1, −1−a];
- a step of judging said sample output to be one of five values from the high/low relationship with sample outputs before and after said sample output and the temporal judgment values of said classified three groups;
- a step of computing phase errors from said five-value judgment value and said sample output; and
- a clock generation step of generating clocks with a phase according to said phase error.

8. The phase synchronization method for an extended partial response according to claim 7, wherein said judgment step comprises a step of judging "1+a" or "1" from the high/low relationship between the sample output and said sample outputs before and after and the sample output when said temporal judgment value is in the [1+a, 1] group, and judging "−1−a" or "−1" from the high/low relationship between the sample output and said sample outputs before and after the sample output when said temporal value is in the [−1, −1+a] group.

9. A phase synchronization circuit for an extended partial response which synchronizes phases after executing extended partial response equalization on recording signals read from a recording medium, comprising:
- an equalizer which executes extended partial response equalization on said recording signals;
- a sampler which samples said equalization output by clocks; and
- a phase synchronization circuit which detects a phase error of said sample output and generates clocks synchronizing with the phase of said recording signal; and wherein said phase synchronization circuit comprises:
- a temporal judgment unit which temporarily judges the sample output of a gap pattern with a 6T period (T is a sampling period) written in the acquisition area of said recording medium to be one of two values (1, −1);
- a phase error computing unit which computes a phase error from said temporal judgment value and said sample output;
- an adder which adds said phase errors for three samples; and
- a clock generator which generates clocks with a phase according to said addition result.

10. The phase synchronization circuit for an extended partial response according to claim 9, wherein:
said phase synchronization circuit further comprises a five-value judgment unit which judges said sample output to be one of five values;

and wherein said error computing unit is composed of a computing unit which computes a phase error from said temporal judgment value and said sample output at acquisition, and computes said phase error from said five-value judgment output and said sample output at tracking; and wherein said clock generator is composed of a generator which generates clocks with a phase according to said addition result at said acquisition and generates clocks with a phase according to said phase error at tracking.

11. The phase synchronization circuit for an extended partial response according to claim 9, wherein said phase synchronization circuit further comprises a register which retains said temporal judgment value; and wherein said temporal judgment unit is composed of a judgment circuit which selects a first threshold value or a second threshold value according to said retention value, and compares the selected threshold value and said sample output.

12. The phase synchronization circuit for an extended partial response according to claim 11, wherein said temporal judgment unit further comprises;
an initialization circuit which judges said sample output to be one of two values depending on the polarity of said sample output, and initializes said retention value.

13. A phase synchronization circuit for an extended partial response which synchronizes phases after executing extended partial response equalization on recording signals read from a recording medium, comprising:
- an equalizer which executes extended partial response equalization on said recording signals;
- a sampler which samples the output of said equalizer by clocks; and
- a phase synchronization circuit which detects a phase error of said sample output and generates clocks synchronizing with the phase of said recording signal;

and wherein said phase synchronization circuit comprises:
- a classifying unit which classifies said sample output into three groups of temporal judgment values [1+a, 1], 0, and [−1, −1−a];
- a judgment unit which judges said sample output to be one of five values from the higher/lower relationship with sample outputs before and after said sample output, and the temporal judgment values of said classified three groups;
- an error computing unit which computes phase error from said five-value judgment value and said sample output; and
- a clock generator which generates clocks with a phase according to said phase error.

14. The phase synchronization circuit for an extended partial response according to claim 13, wherein said judgment unit is composed of a judgment unit which judges "1+a" or "1" from the high/low relationship between said sample outputs before and after and the sample output when said temporal judgment value is in the [a+1, 1] group, and judges that the sample output is [−1−a] or [−1] from the high/low relationship between said sample outputs before and after and the sample output when said temporal judgment value is in the [−1, −1−a] group.

15. The phase synchronization circuit for an extended partial response according to claim 13, wherein said phase synchronization circuit further comprises:

a classifying unit which classifies said sample output into three groups of temporal judgment values [1+a, 1], 0, and [−1, −1−a]; and a five-value judgment unit which judges said sample output to be one of five values from the high/low relationship with sample outputs before and after said sample output and the temporal judgment values of said classified three groups;

and wherein said error computing unit is composed of a computing unit which computes the phase error from said temporal judgment value and said sample output at acquisition, and computes the phase error from said five-value judgment value and said sample output at tracking; and said clock generator is composed of a generator which generates clocks with a phase according to said addition result at acquisition and generates clocks with a phase according to said phase error at tracking.

16. A read channel circuit for an extended partial response which decodes after executing extended partial response equalization on recording signals read from a recording medium, comprising:

an equalizer which executes extended partial response equalization on said recording signals;

a sampler which samples the output of said equalizer by clocks;

a decoder which obtains decoding signals from said sample output; and a phase synchronization circuit which detects the phase error of said sample output and generates clocks synchronizing the phase of said recording signal;

wherein said phase synchronization circuit comprises:

a temporal decision unit which temporarily judges the sample output of a gap pattern with a 6T period (T is a sampling period) written in the acquisition area of said recording medium to be one of two values (1, −1);

an error computing unit which computes the phase error from said temporal judgment value and said sample output;

an adder which adds the output of said error computing unit for three samples; and a clock generator which generates clocks with a phase according to said addition output.

17. The read channel circuit for an extended partial response according to claim 16, further comprising:

a gain control circuit which controls the amplitude of said recording signal;

a second equalizer which is included in said decoder and executes (1+D) equalization on said sample output; and an automatic gain control circuit which adjusts the gain of said automatic gain control circuit using the output of said second equalizer at the sample value where said temporal judgment value does not change.

18. The read channel circuit for an extended partial response according to claim 16, further comprising:

a second equalizer which is included in said decoder and executes (1+D) equalization on said sample output; and an offset adjustment circuit which adjusts the DC offset value of said sampler using the output of said second equalizer at the sample value where said temporal judgment value changes.

19. The read channel circuit for an extended partial response according to claim 16, further comprising:

a five-value judgment unit which judges said sample output to be one of five values;

a second error computing unit which computes said phase error from the output of said five-value judgment unit and said sample output;

a switch which inputs the output of said adder to said clock generator at acquisition, and inputs the output of said second error computing unit to said clock generator at tracking; and a FIR filter with an odd number of taps to compensate said sample output;

wherein said output of said FIR filter is input to said five-value judgment unit, and the output of said sampler is input to said temporal judgment unit.

20. The read channel circuit for an extended partial response according to claim 16, further comprising:

a five-value judgment unit which judges said sample output to be one of five values;

a second error computing unit which computes said phase error from the output of said five-value judgment unit and said sample output;

a switch which inputs the output of said adder to said clock generator at acquisition, and inputs the output of said second error computing unit to said clock generator at tracking;

a FIR filter with an even number of taps to compensate said sample output; and a third equalizer which executes (1+D) equalization on said sample output;

wherein said output of said FIR filter is input to said five-value judgment unit and the output of said third equalizer is input to said temporal judgment unit.

21. The read channel circuit for an extended partial response according to claim 16, further comprising:

a gain control circuit which controls the amplitude of said recording signal;

a multiplier which squares said sample output;

an adder which adds the multiplication output for three samples; and an automatic gain control circuit which adjusts the gain of said automatic gain control circuit according to said addition output.

22. The read channel circuit for an extended partial response according to claim 16, wherein said phase synchronization circuit further comprises:

a classifying unit which classifies said sample output into three groups of temporal judgment values [1+a, 1], 0 and [−1, −1−a]; and a five-value judgment unit which judges said sample output to be one of five values from the high/low relationship with sample outputs before and after said sample output and the temporal judgment values of said classified three groups;

wherein said error computing unit is composed of a computing unit which computes the phase error from said temporal judgment value and said sample output at acquisition, and computes the phase error from said five-value judgment value and said sample output at tracking; and said clock generator is composed of a generator which generates clocks with a phase according to said addition result at said acquisition, and generates clocks with a phase according to said phase error at tracking.

* * * * *

UNITED STATES PATENT AND TRADEMARK OFFICE
CERTIFICATE OF CORRECTION

PATENT NO.    : 6,654,413 B2
DATED         : November 25, 2003
INVENTOR(S)   : Shimoda It is certified that error appears in the above-identified patent and that said Letters Patent is hereby corrected as shown below:

Column 17,
Line 42, delete "[-1, -1+a]" and insert -- [-1, -1-a] -- therefore.

Signed and Sealed this

Twenty-seventh Day of April, 2004

JON W. DUDAS
*Acting Director of the United States Patent and Trademark Office*